US011799115B2

(12) United States Patent
Milcarek et al.

(10) Patent No.: US 11,799,115 B2
(45) Date of Patent: Oct. 24, 2023

(54) MICROCOMBUSTION MICRO-TUBULAR FLAME-ASSISTED FUEL CELL FOR POWER AND HEAT COGENERATION WITHOUT SOOT FORMATION

(71) Applicants: Ryan Milcarek, Gilbert, AZ (US); Jeongmin Ahn, Manlius, NY (US)

(72) Inventors: Ryan Milcarek, Gilbert, AZ (US); Jeongmin Ahn, Manlius, NY (US)

(73) Assignee: Syracuse University, Syracuse, NY (US)

( * ) Notice: Subject to any disclaimer, the term of this patent is extended or adjusted under 35 U.S.C. 154(b) by 321 days.

(21) Appl. No.: 16/736,278

(22) Filed: Jan. 7, 2020

(65) Prior Publication Data
US 2020/0227766 A1     Jul. 16, 2020

Related U.S. Application Data

(60) Provisional application No. 62/789,463, filed on Jan. 7, 2019.

(51) Int. Cl.
*H01M 8/1253* (2016.01)
*H01M 8/1213* (2016.01)
(Continued)

(52) U.S. Cl.
CPC ..... *H01M 8/1253* (2013.01); *H01M 8/04022* (2013.01); *H01M 8/04074* (2013.01); *H01M 8/1213* (2013.01); *H01M 2008/1293* (2013.01)

(58) Field of Classification Search
CPC ........... H01M 8/1253; H01M 8/04022; H01M 8/04074; H01M 8/1213; H01M 2008/1293
See application file for complete search history.

(56) References Cited

U.S. PATENT DOCUMENTS

| 2007/0243444 A1* | 10/2007 | Zheng | H01M 8/243 |
| | | | 429/513 |
| 2014/0363776 A1* | 12/2014 | Ahn | H01M 8/243 |
| | | | 432/92 |

(Continued)

FOREIGN PATENT DOCUMENTS

JP     2013177300 A   *   9/2013   ............ B01J 8/0492

OTHER PUBLICATIONS

JP2013177300A Inoue translation (Year: 2013).*

(Continued)

*Primary Examiner* — Cynthia H Kelly
*Assistant Examiner* — Tarik J Phillip
(74) *Attorney, Agent, or Firm* — Bond, Schoeneck & King, PLLC; David L. Nocilly

(57) ABSTRACT

A non-catalytic microcombustion based FFC for the direct use of hydrocarbons for power generation. The potential for high FFC performance (450 mW·cm$^{-2}$ power density and 50% fuel utilization) in propane/air microcombustion exhaust was demonstrated. The micro flow reactor was used as a fuel reformer for equivalence ratios from 1-5.5. Soot formation in the micro flow reactor was not observed at equivalence ratios from 1 to 5.5 and maximum wall temperatures ranging from 750 to 900° C. $H_2$ and CO concentrations in the exhaust were found to have a strong temperature dependence that varies with the maximum wall temperature and the local flame temperature.

14 Claims, 22 Drawing Sheets

(51) Int. Cl.
*H01M 8/04007* (2016.01)
*H01M 8/04014* (2016.01)
*H01M 8/12* (2016.01)

(56) References Cited

U.S. PATENT DOCUMENTS

2018/0115008 A1* 4/2018 Hwang ............... H01M 8/2425
2018/0328278 A1* 11/2018 Nemitallah ............. F23R 3/286
2021/0143448 A1* 5/2021 Blackburn .......... H01M 8/0245

OTHER PUBLICATIONS

Lei et al., "A highly active hybrid catalyst modified (La0.60Sr0.40)0.95Co0.20Fe0.8003-δ cathode for proton conducting solid oxide fuel cells" Journal of Power Sources. 389 (Apr. 6, 2018) pp. 1-7 (Year: 2018).*

Wang et al., "Power and heat co-generation by micro-¬tubular flame fuel cell on a porous media burner" Energy, vol. 109. Aug. 15, 2016. pp. 117-123. (Year: 2016).*

Milcarek et al., "Microcombustion for micro-tubular flame-assisted fuel cell power and heat cogeneration" J. of Power Sources. vol. 413. Feb. 15, 2019, p. 191-197. (Year: 2019).*

* cited by examiner

MICROCOMBUSTION MICRO-TUBULAR FLAME-ASSISTED FUEL CELL FOR POWER AND HEAT COGENERATION WITHOUT SOOT FORMATION

CROSS-REFERENCE TO RELATED APPLICATIONS

The present application claims priority to U.S. Provisional Application No. 62/789,463, filed on Jan. 7, 2019.

BACKGROUND OF THE INVENTION

1. Field of the Invention

The present invention relates to flame-assisted fuel cells and, more specifically, to a microcombustion system for the direct use of hydrocarbons for power generation.

2. Description of the Related Art

Direct Flame Fuel Cells (DFFCs) are Solid Oxide Fuel Cells (SOFCs) which are placed directly in a flame in a 'no chamber' setup for direct conversion of syngas to electrical power. The setup is characterized by premixed fuel and air at a specified equivalence ratio, which is ignited in the ambient for partially premixed combustion. The SOFC is brought to operating temperature (500-1000° C.) by being placed directly in the flame where syngas and other unburned hydrocarbons are present. Challenges in DFFC research include low electrical efficiency (<0.5%) and low power density (often below 400 mW·cm$^{-2}$). Recently a Flame-assisted Fuel cell (FFC) was proposed, which is like a DFFC, but operates in a dual-chamber configuration with a combustion chamber upstream of the SOFC. This premixed combustion system avoids complete oxidation of the fuel with excess air which is present in conventional DFFCs. As a result, more fuel enters the SOFC anode for electrochemical power generation which is expected to yield higher electrical efficiency and power density. The fuel/air equivalence ratio is a dominant factor in these studies as the highest syngas concentration occurs at higher equivalence ratios. However, the upper flammability limit has limited the highest attainable syngas generation to only 12.4% $H_2$ and 8.7% CO in methane combustion exhaust at an equivalence ratio of 1.4 and 12.7% $H_2$ and 12.3% CO in propane combustion exhaust at an equivalence ratio of 1.7.

One approach to overcoming the flammability limit is to utilize catalytic reforming of hydrocarbons instead of the gas phase combustion reactions in DFFCs and FFCs. This approach has been investigated extensively since the late 1990s with a catalytic tube reformer and tubular SOFC and has since been commercialized.

Another option for overcoming the upper flammability limit without the use of a catalyst is to utilize superadiabatic combustion. While the upper flammability limit is an issue in conventional burners, in superadiabatic combustion, which utilizes heat recirculation, the notion of an upper flammability limit is less relevant. Heat recirculation to preheat the fuel/air mixture can prevent quenching and allow self-sustained reactions in the ultra-rich and ultra-lean regimes. The micro flow reactor with controlled temperature profile, parallel channel reactor, porous media reactor, swiss roll reactor and spouted bed reactor have been investigated with heat recirculation. Large syngas concentrations in the exhaust exceeding 30% have been reported in the ultra-rich regime at equivalence ratios around 2.5 in many of these studies.

While fuel-rich equivalence ratios exceeding the upper flammability limit are possible with heat recirculation, soot formation is a concern. Soot formation is often documented with the lowest equivalence ratio at which soot formation can be observed and it is often in the range 1.1-1.8 for many fuels. Most DFFC studies have been conducted below this limit, but maximum syngas formation often occurs at higher equivalence ratios. The critical equivalence ratio for soot formation has a strong temperature dependence with the critical equivalence ratio observed to increase with temperature (above 1127° C.=1400K). Few studies at temperatures below 1127° C. exist.

A micro flow reactor with controlled temperature profile has provided a means of studying flame characteristics at lower temperatures and recent studies have suggested that the critical sooting limit may be higher (i.e., less sooting) at temperatures below 1127° C. In one case, no soot formation was observed when the wall temperature of the micro flow reactor did not exceed 827° C., even at an equivalence ratio of 4 with n-cetane and iso-cetane fuel.

Therefore, there is a need in the art for a micro flow reactor design that provides for fuel reformation at high equivalence ratios (>3, by utilizing heat recirculation) without any soot formation (by limiting the maximum wall temperature).

BRIEF SUMMARY OF THE INVENTION

The present invention provides a non-catalytic micro flow reactor and micro-Tubular FFC (mT-FFC) micro heat and power cogeneration system. A micro tubular SOFC is sealed directly to the end of a micro flow reactor having a controlled temperature profile, thereby providing microcombustion-based fuel reformation of hydrocarbons followed by direct utilization of the resulting syngas and smaller hydrocarbons in the mT-FFC. Any remaining fuel is combusted and heat can be recovered for various applications.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 13A:
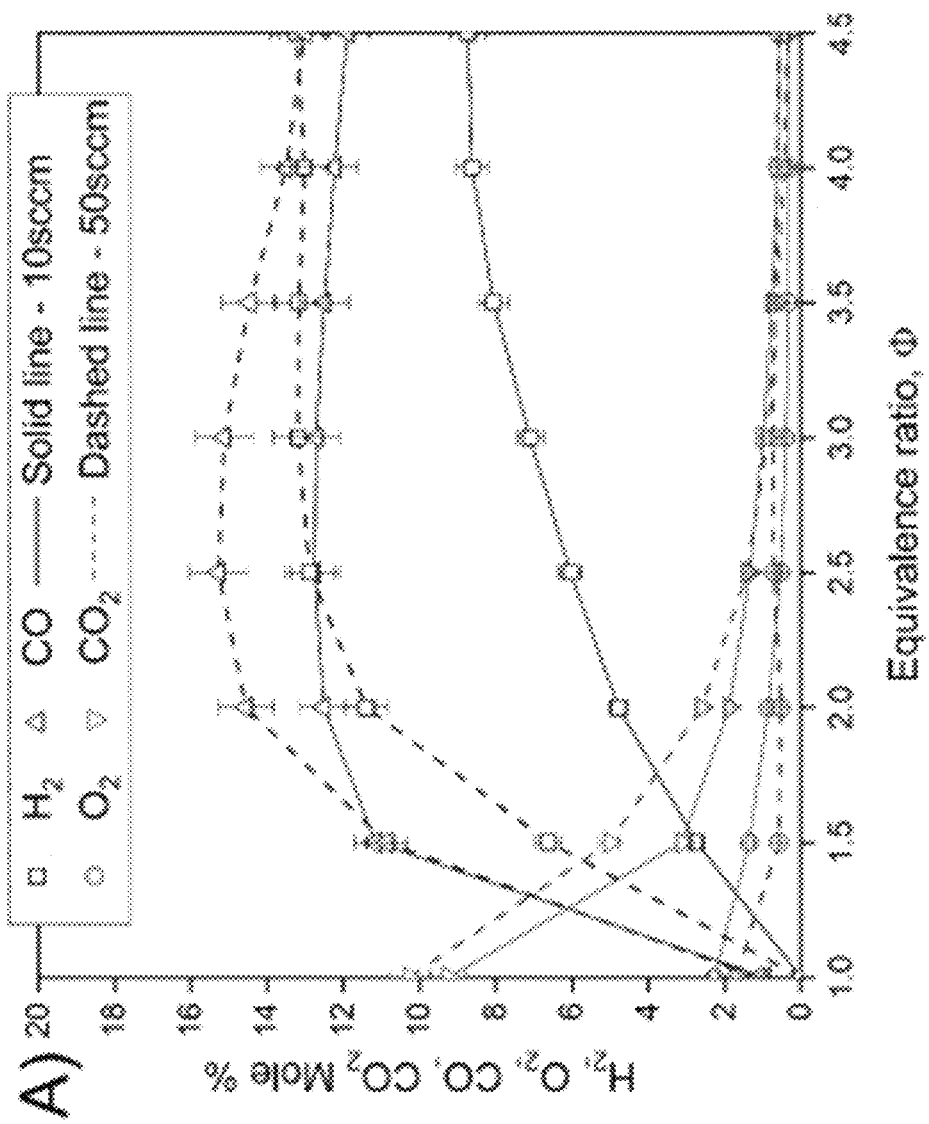
Figure 13B:
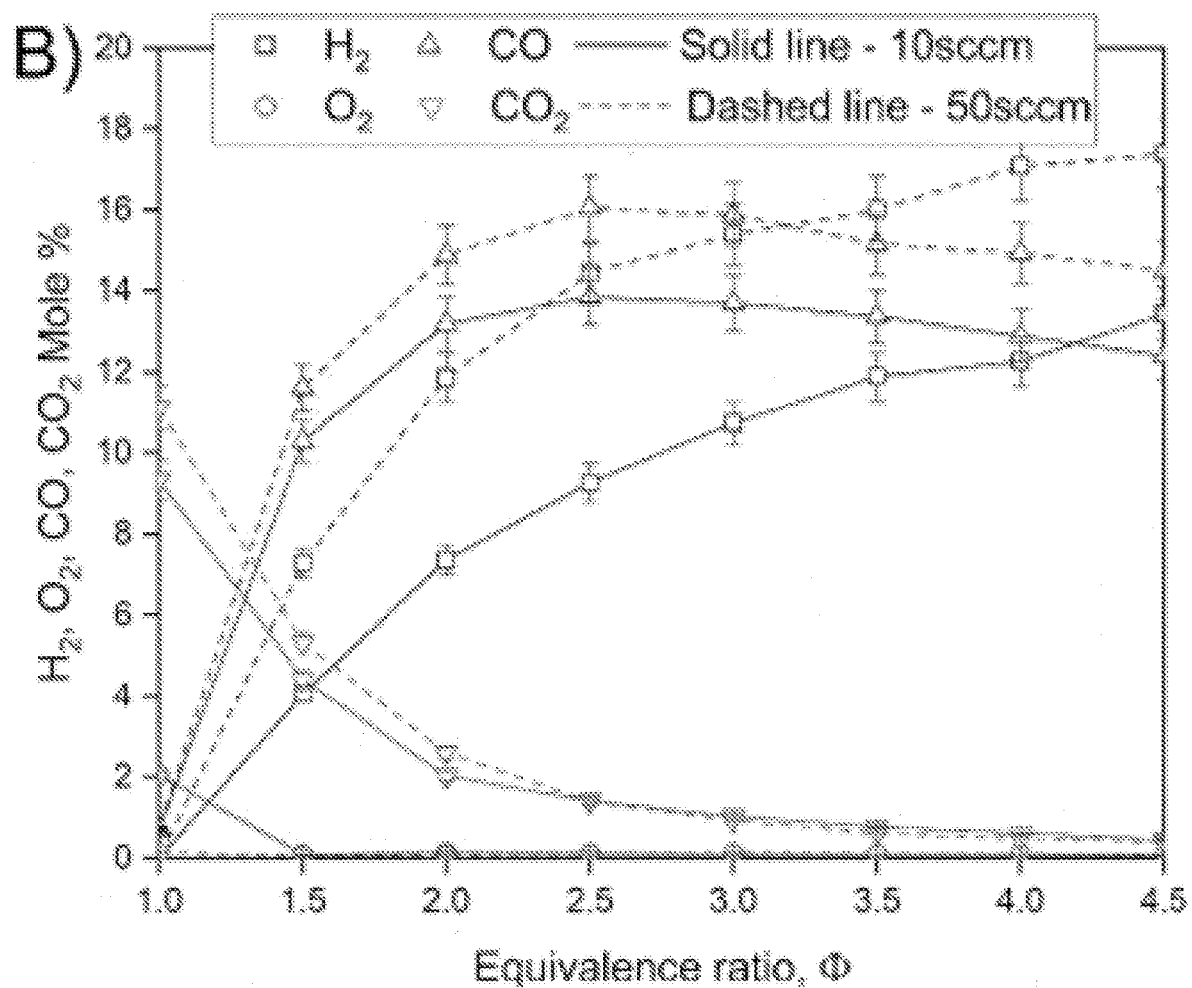
Figure 13C:
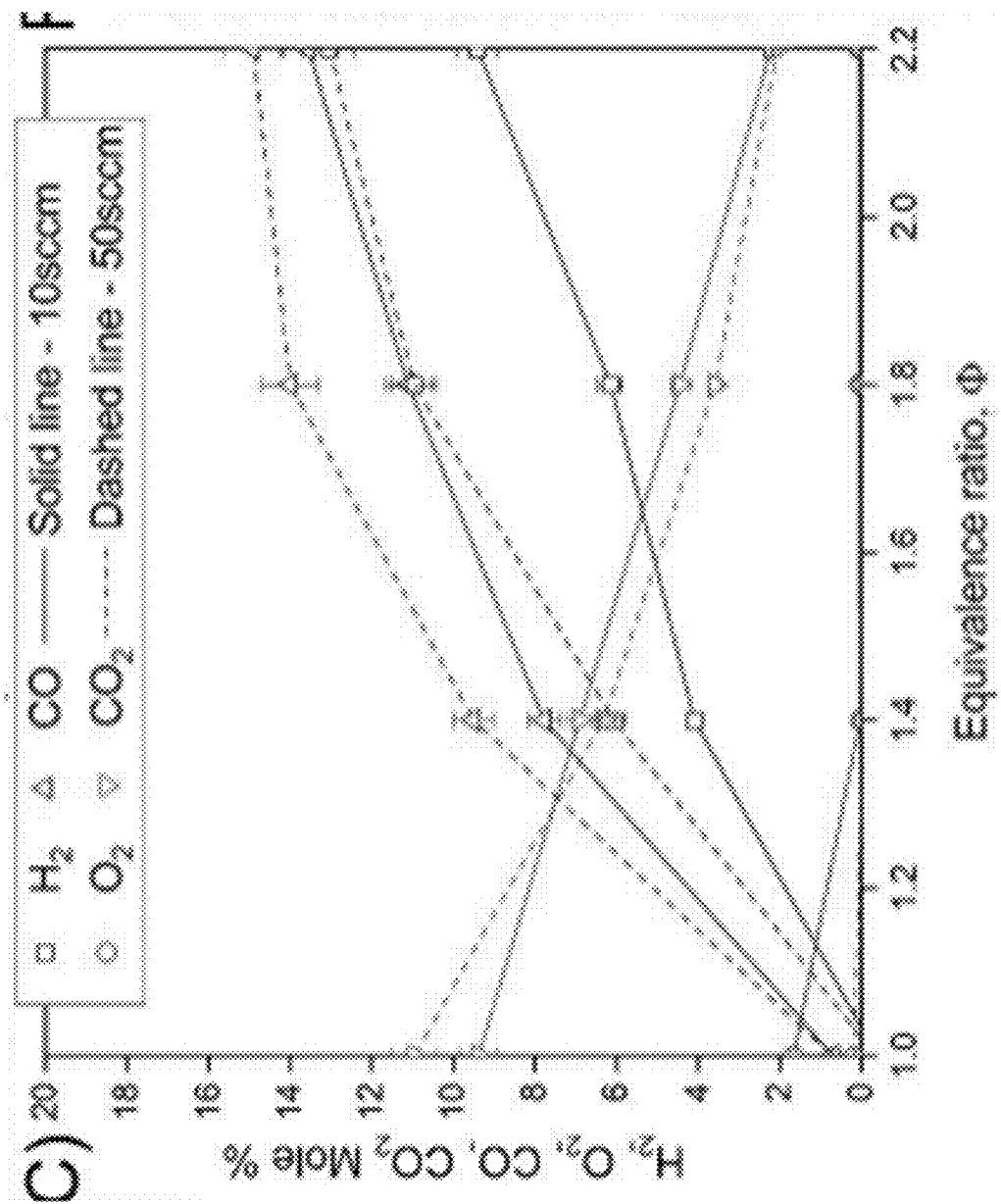
Figure 13D:
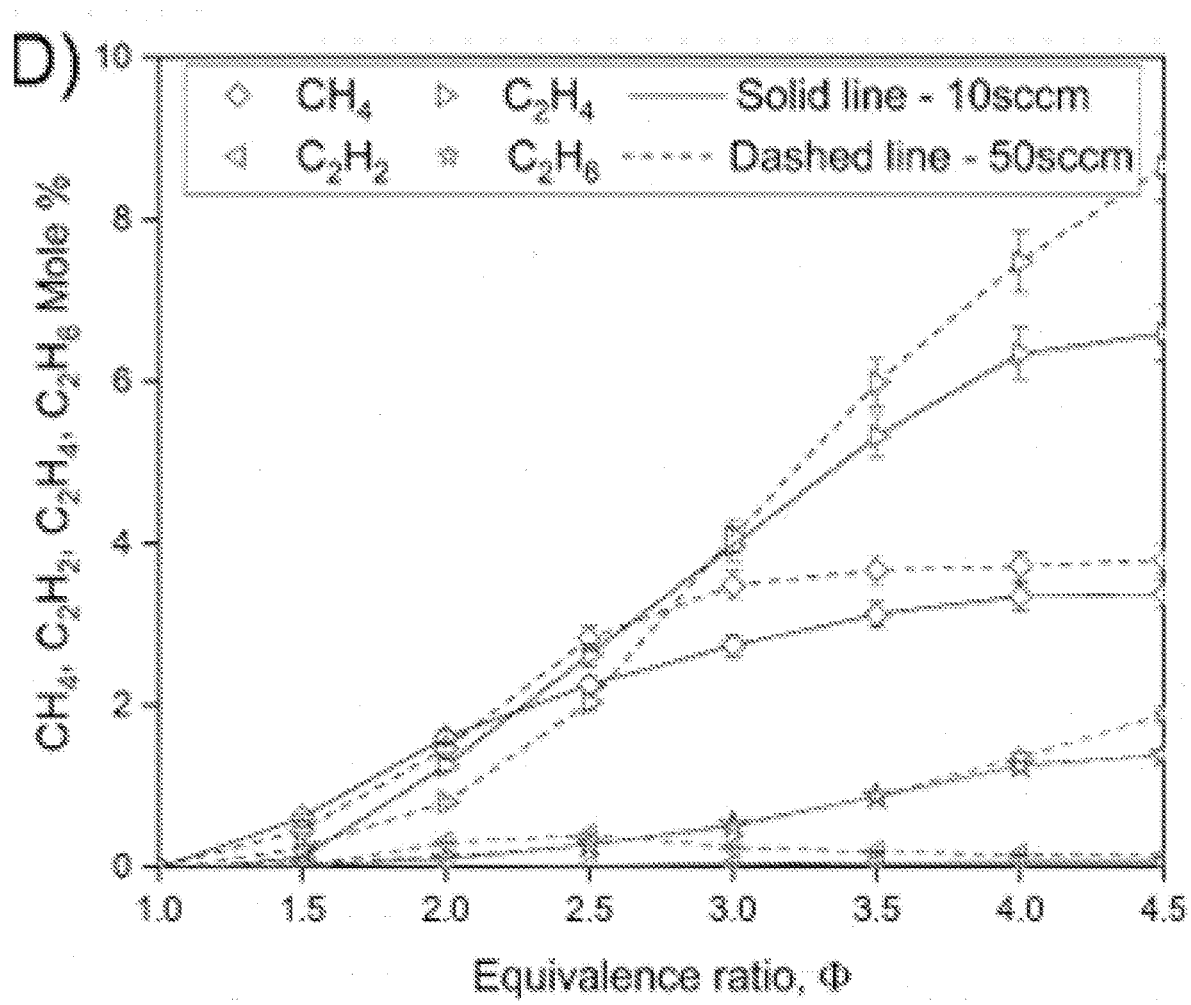
Figure 13E:
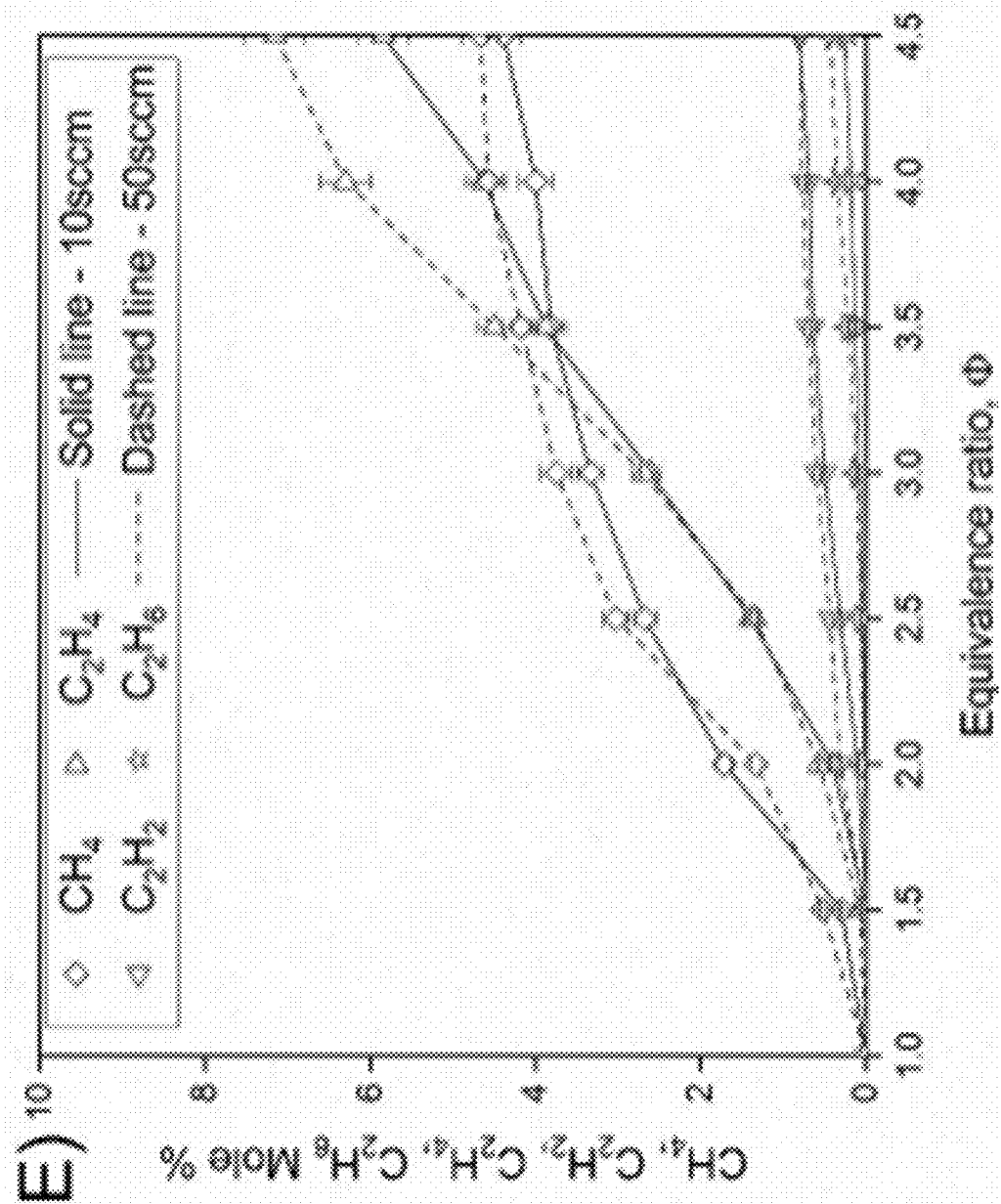
Figure 13F:
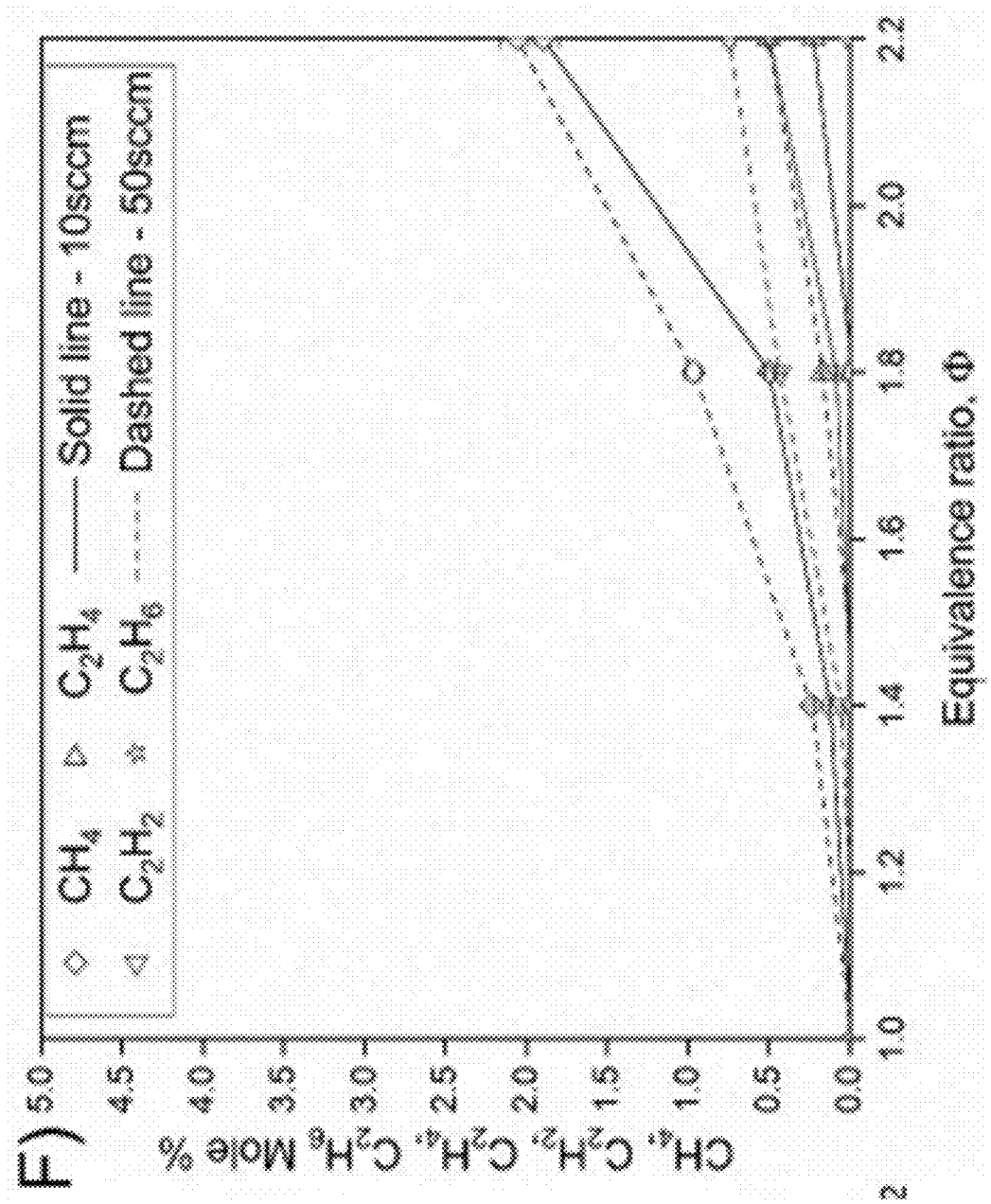

FIG. 13A through 13F are a series of graphs of H2, CO, O2, and CO2 concentrations in ethane/air microcombustion exhaust at wall temperatures where FIG. 13A is 800° C., FIG. 13B is 900° C. and FIG. 13C is 1000° C. as well as CH4, C2H2, C2H4 and C2H6 concentrations in the microcombustion exhaust at wall temperatures where FIG. 13D is 800° C., FIG. 13E is 900° C., and FIG. 13F is 1000° C., for total flow rates of 10 and 50 mL·min−1.

Figure 14:
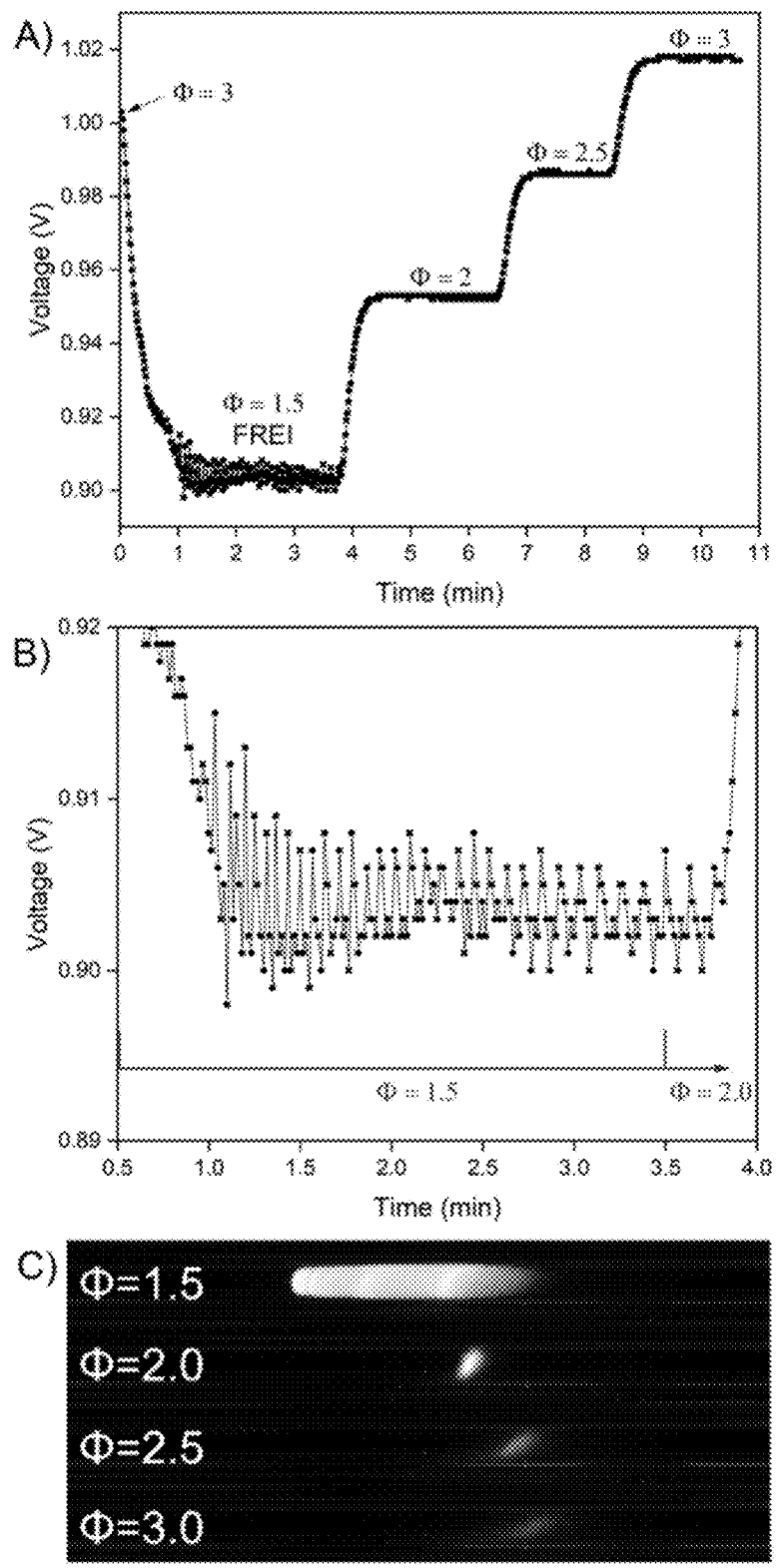

FIG. 14 is a series of panels were A) is mT-SOFC OCV at equivalence ratios of 1.5, 2, 2.5 and 3, B) is a detailed view of the OCV at an equivalence ratio of 1.5 and C) are direct images of the flame at each equivalence ratio, all for a total flow rate of 100 mL·min$^{-1}$.

Figure 15:
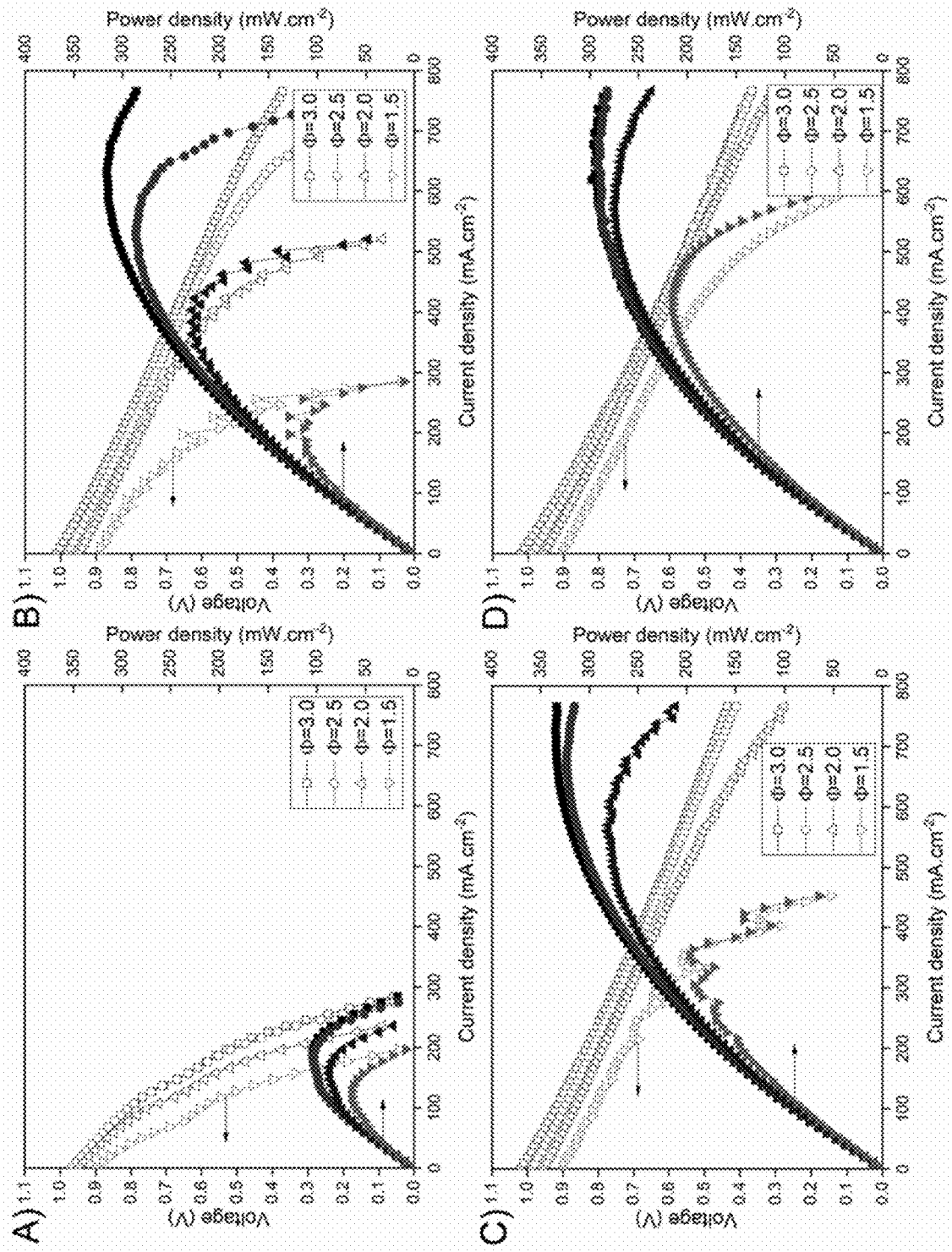

FIG. 15 is a series of graphs of mT-SOFC polarization and power density in ethane/air microcombustion exhaust at 800° C. for different equivalence ratios, Φ, from 1.5 to 3 and for different total flow rates of A) 10 mL·min$^{-1}$, B) 50 mL·min$^{-1}$, C) 100 mL·min$^{-1}$ and D) 150 mL·min$^{-1}$.

Figure 16:
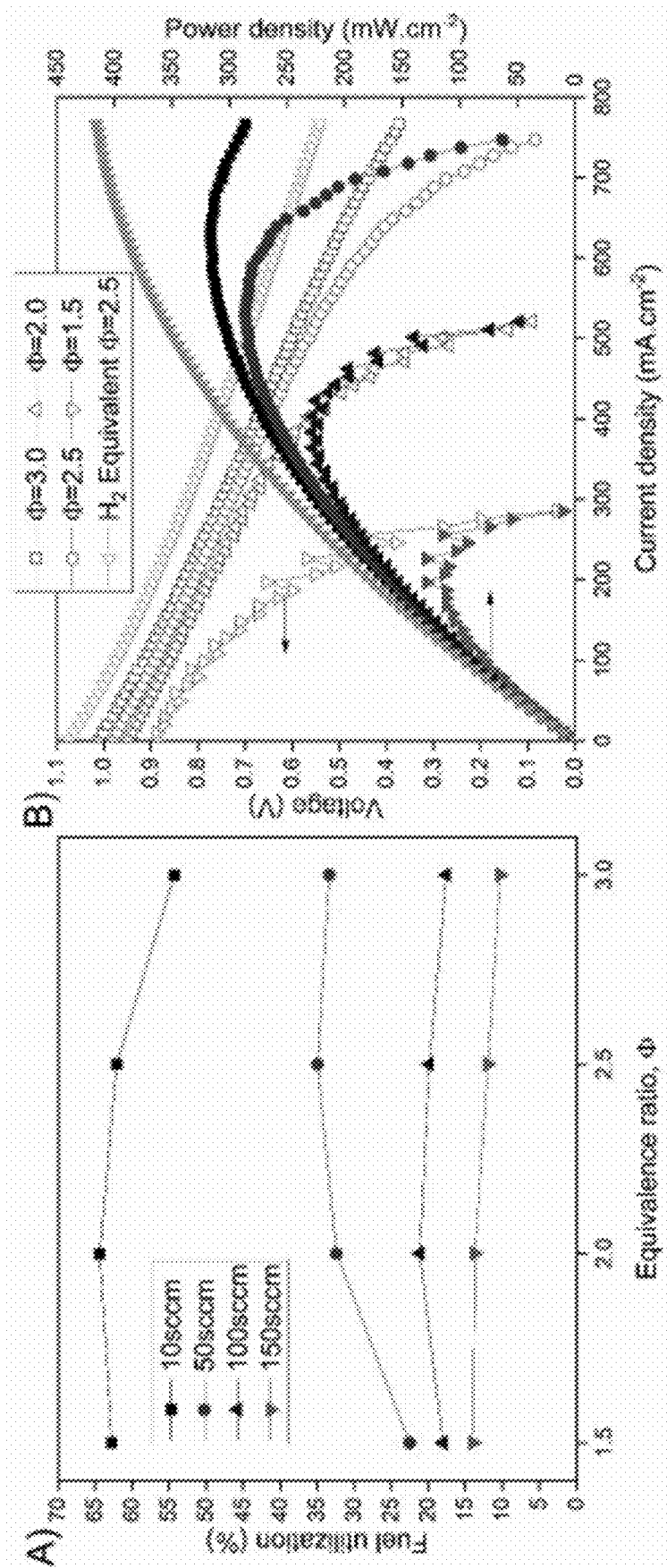

FIG. 16 is a pair of graphs of A) mT-SOFC fuel utilization at different total flow rates and equivalence ratios and B) polarization and power density comparison to a baseline of $H_2$ and $N_2$ at a total flow rate of 50 mL·min$^{-1}$.

Figure 17:
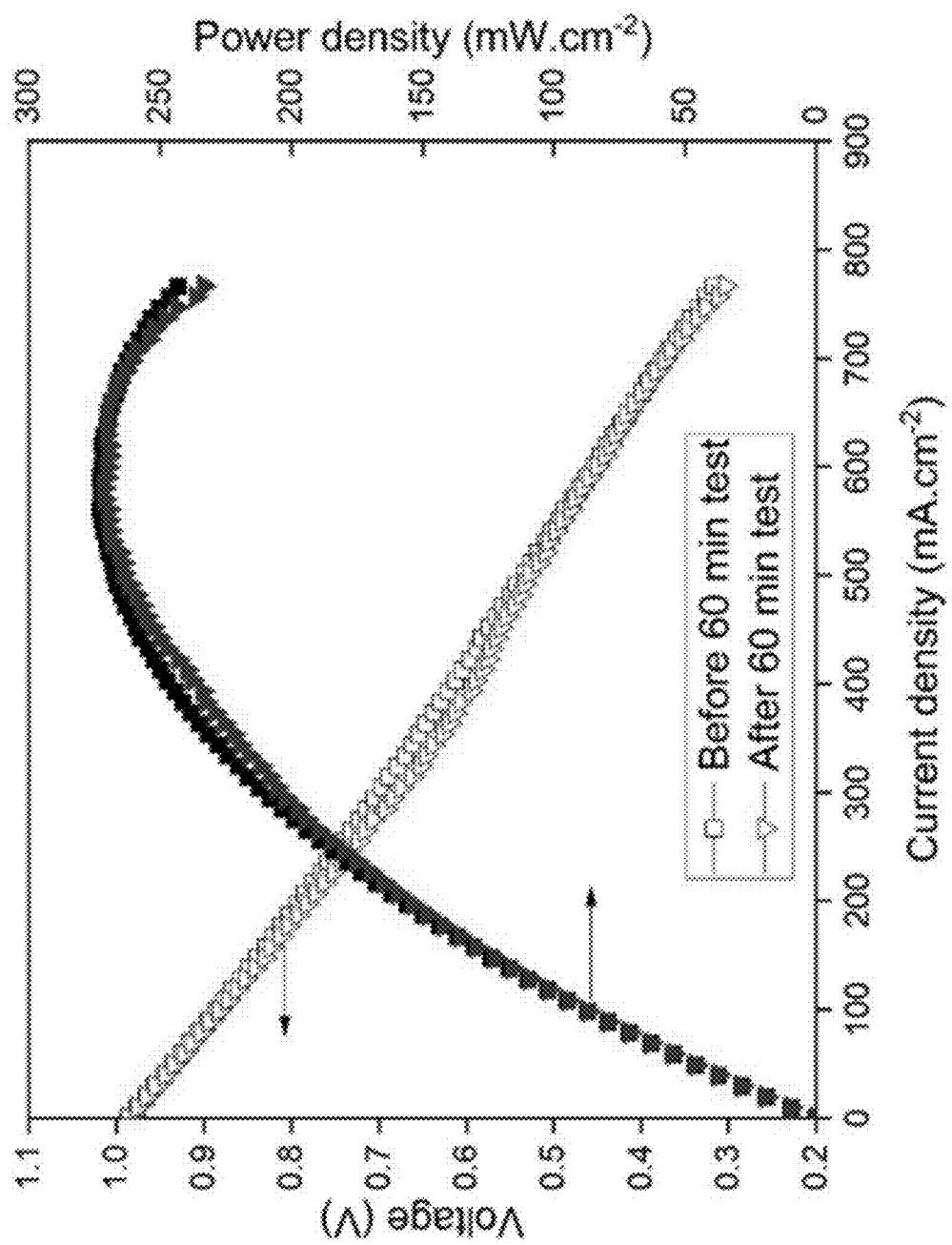

FIG. 17 is a graph of mT-SOFC polarization and power density comparison before and after a short term test of 60 minutes.

DETAILED DESCRIPTION OF THE INVENTION

Figure 1:
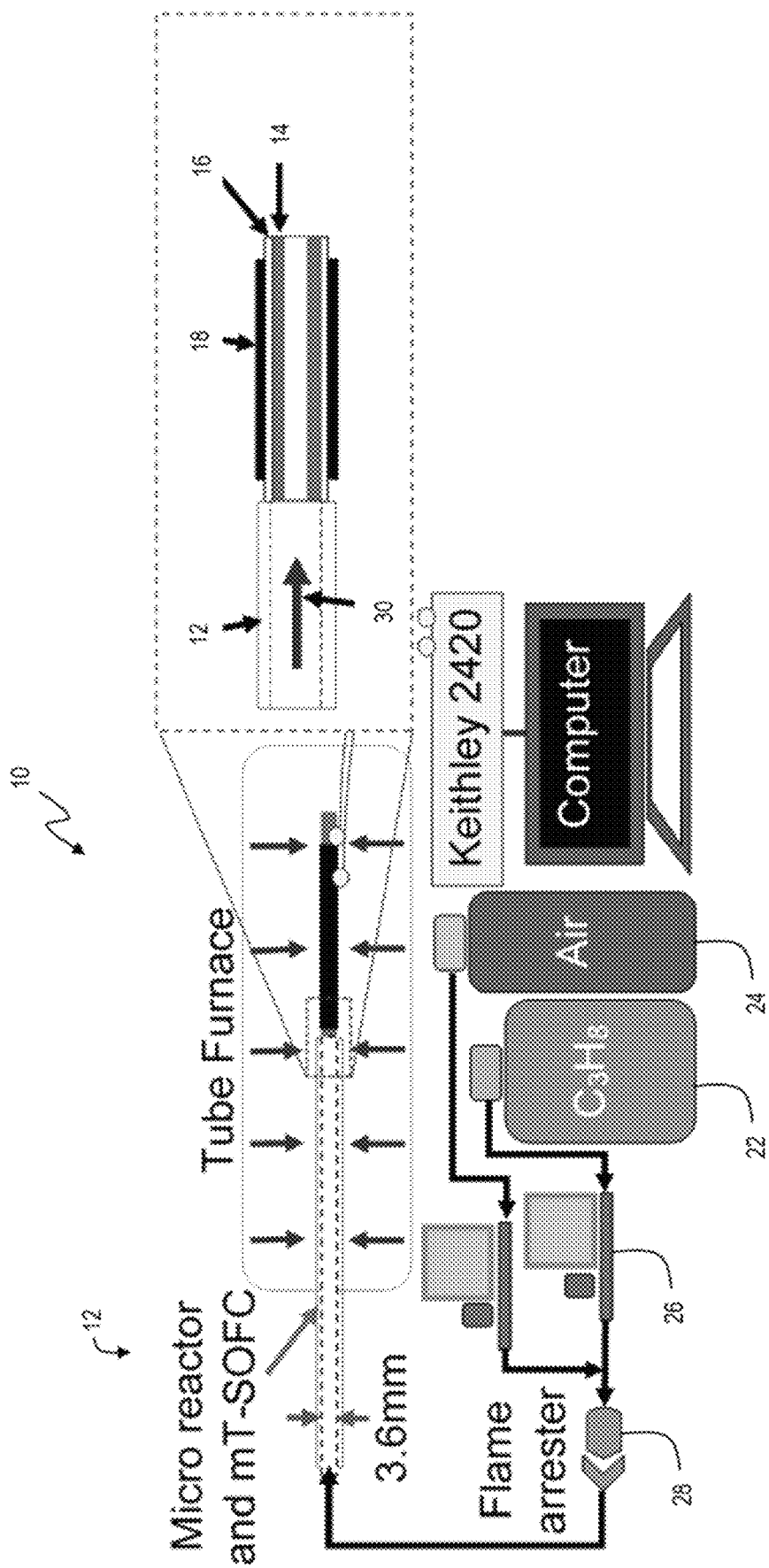
FIG. 1 is a schematic of an mT-FFC system according to the present invention.

Referring to the figures, wherein like numeral refer to like parts throughout, there is seen in FIG. 1 an exemplary mT-FFC system 10 according to the present invention that comprises a microreactor 12 coupled to an mT-SOFC 32 having an anode 14 positioned within an electrolyte 16 and cathode 18. A source of gaseous hydrocarbon 22, e.g., propane ($C_3H_8$), 22 and a source of air 24 are coupled via flow meters 26 and a flame arrester 28 to microreactor 12. Combustion exhaust 30 from microreactor 12 is fed to mT-SOFC 32 for direct conversion of syngas to electrical power. In the present application, the following acronyms are used for the invention as follows DFFC—Direct flame fuel cell
F—Faraday constant
FFC—Flame-assisted fuel cell
FREI—Flame with repetitive extinction and ignition
GC—Gas chromatograph
I—Current
LSCF—Lanthanum strontium cobalt ferrite
mT-FFC—micro-tubular flame-assisted fuel cell
mT-SOFC—micro-tubular solid oxide fuel cell
$n_{fuel}$—Molar flow rate of fuel
$n_{air}$—Molar flow rate of air
$n_{fuel}^S$—Molar flow rate of fuel for stoichiometric reaction
$n_{air}^S$—Molar flow rate of air for stoichiometric reaction
SDC—Samaria-doped Ceria
SOFC—Solid oxide fuel cell
$V^M$—Molar volume at standard conditions
$V_{fuel}$—Flowrate of propane
YSZ—Yttria stabilized zirconia, $(Y_2O_3)_{0.08}(ZrO_2)_{0.92}$
Φ—Equivalence ratio
$\varepsilon_{F.U.}$—Fuel utilization The present invention may be incorporated into or used as a replacement for a steam reformer. Steam reformers are large, require water, and are inefficient. Steam reformers generate hydrogen and carbon monoxide. The market for hydrogen is growing rapidly which results in many opportunities for that type of technology and, in this of the present invention, can be performed without soot formation which is not possible with current partial oxidation reactors. Steam reformers usually do not have soot formation, but the present invention is much simpler as stated above.

Example

A micro tubular SOFC anode (Ni+$(Y_2O_3)_{0.08}(ZrO_2)_{0.92}$ (YSZ)) and electrolyte (YSZ) fabrication is known in the field. The inside diameter of the anode was 2.4 mm and the outside diameter was 3.3 mm. In order to investigate temperatures below 827° C., a $Sm_{0.20}Ce_{0.80}O_{2-x}$ (SDC) buffer layer was applied to the YSZ electrolyte using a wet powder spray technique, dried and sintered at 1350° C. for 4 hours. A $(La_{0.60}Sr_{0.40})_{0.95}Co_{0.20}Fe_{0.80}O_{3-x}$ (LSCF)+SDC (7:3 w/w) cathode was dip coated onto the SDC buffer layer, dried and sintered to 1100° C. for 4 hours. Silver paste was used for cathode current collection with an active area of 1.66 cm$^2$. The SOFC was sealed to the end of a quartz tube (3.6 mm ID), which served as microreactor 12, using ceramic paste. Testing of the micro tubular SOFC occurred at two temperatures (750° C. and 800° C.) in a horizontal split tube furnace. The current-voltage method with four probe technique was utilized for electrochemical characterization of the SOFC. A Keithley 2420 sourcemeter was interfaced with a computer and mass flow controllers were controlled with LabVIEW software. Propane was used as the fuel in this example. The flow rate of propane was fixed during testing and the air flow rate was adjusted to achieve the proper equivalence ratio. Equivalence ratio (Φ) is defined in Eq. (1) where $n_{fuel}$ and $n_{air}$ denote the molar flow rates of fuel and air, respectively; and $n^S_{fuel}$ and $n^S_{air}$ denote the molar flow rates required for stoichiometric combustion of fuel and air, respectively. K-type thermocouples monitored the temperature of the inside of the micro flow reactor, hereafter referred to as the wall temperature, and the SOFC anode temperature.

$$\Phi = \frac{n_{fuel}/n_{air}}{n^S_{fuel}/n^S_{air}} \quad (1)$$

Characterization of the microcombustion of propane/air was conducted in the same micro flow reactor with a conventional flat flame burner setup for flame visualization. The micro flow reactor utilized in both the fuel cell and microcombustion characterization experiments has the following characteristics.

Figure 9:
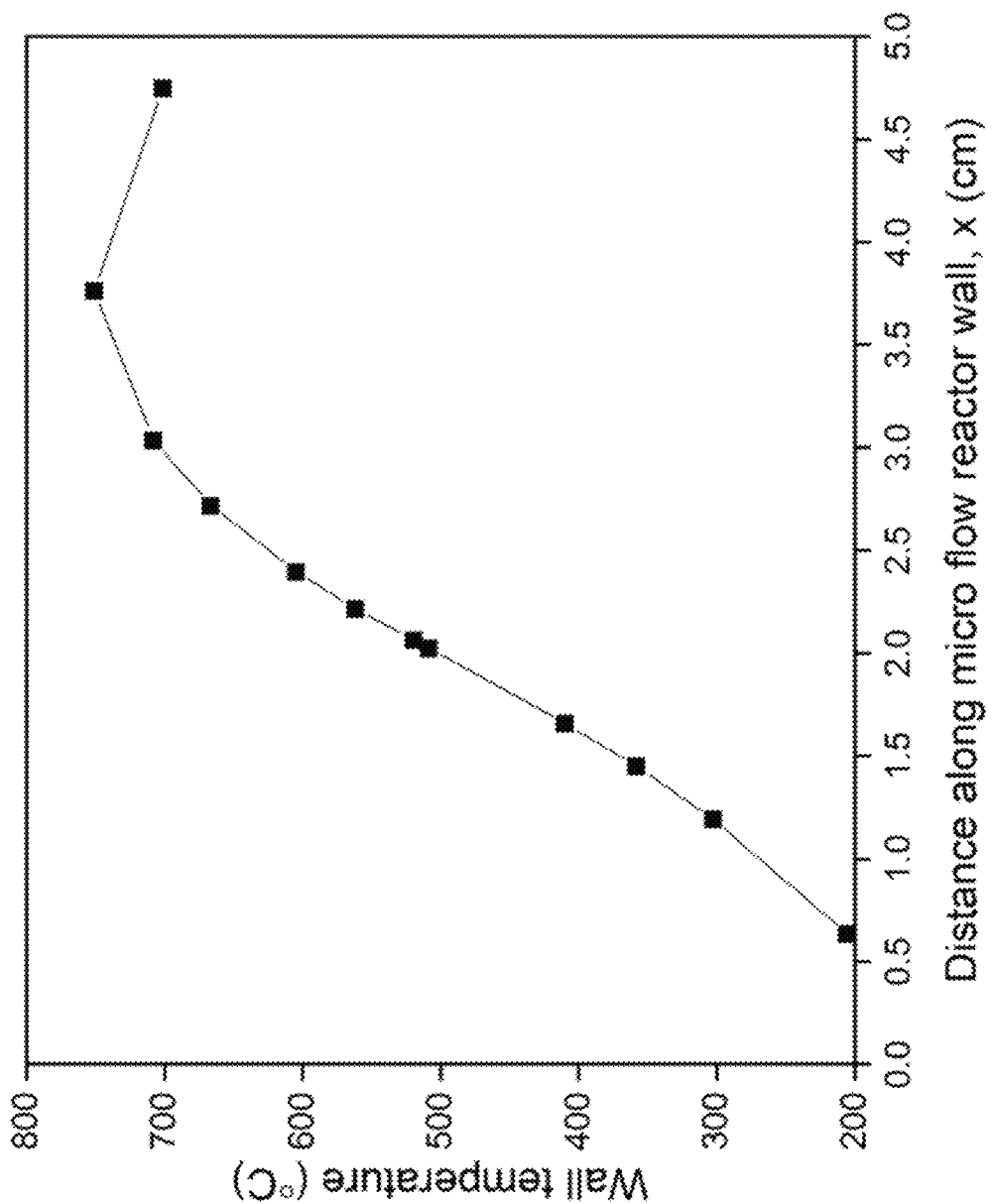
FIG. 9 is a graph of wall temperature over the distance along the microflow reactor wall.

The fuel/air mixture is sent to the micro flow reactor at ambient temperature. Upon entering the furnace or passing through the flat flame burner, the wall temperature rises until it reaches a maximum value which was carefully controlled in these experiments. The flame stabilizes in the region of maximum wall temperature for both experiments. The maximum wall temperature at the bottom inner surface of the micro flow reactor was measured with a K-type thermocouple. An example of a typical wall temperature profile for a maximum wall temperature of 750° C. is shown in FIG. 9. Two types of experiments were performed for the microcombustion characterization. First, the flame and sooting characteristics of propane/air microcombustion were investigated for equivalence ratios from 1-5.5, total flow rates from 10-180 mL/min (velocities from 1.6-30 cm/s), and temperatures of 750, 800, 850, 900, 950 and 1000° C. A digital camera (Nikon D300S) was used to take images of the flame and thermal radiation from the soot in the reactor. The flow rate of fuel and air were set to the proper equivalence ratio and the flame stabilized for 40 s before taking an image. A regime map of flame and soot characteristics was plotted on the flow rate vs. equivalence ratio plane. A second set of experiments investigated the microcombustion exhaust composition for a fixed propane flow rate of 2 mL/min with equivalence ratios from 1-5.5 and maximum wall temperatures of 750, 800, 850, 900, 950 and 1000° C. Exhaust gas was sampled with a gas chromatograph (GC-2010 Plus) with a BID-2010 Plus detector.

As an example of the equivalence ratio calculations and the flow rates utilized, Table 1 below shows flow rates for the experiments with a fixed propane flow rates of 2 mL/min.

TABLE 1

Propane/air flow rates for different equivalence ratios and a fixed propane flow rate of 2 mL/min

| Equivalence ratio, Φ | Propane flow rate (mL/min) | Air flow rate (mL/min) |
| --- | --- | --- |
| 1.4 | 2 | 34.00 |
| 1.6 | 2 | 29.75 |
| 1.8 | 2 | 26.44 |
| 2.0 | 2 | 23.80 |
| 2.2 | 2 | 21.64 |
| 2.4 | 2 | 19.83 |
| 2.6 | 2 | 18.31 |
| 2.8 | 2 | 17.00 |
| 3.0 | 2 | 15.87 |
| 3.2 | 2 | 14.88 |
| 3.4 | 2 | 14.00 |
| 3.6 | 2 | 13.22 |
| 3.8 | 2 | 12.53 |
| 4.0 | 2 | 11.90 |
| 4.2 | 2 | 11.33 |
| 4.4 | 2 | 10.82 |
| 4.6 | 2 | 10.35 |
| 4.8 | 2 | 9.92 |
| 5.0 | 2 | 9.52 |
| 5.2 | 2 | 9.15 |

Figure 2:
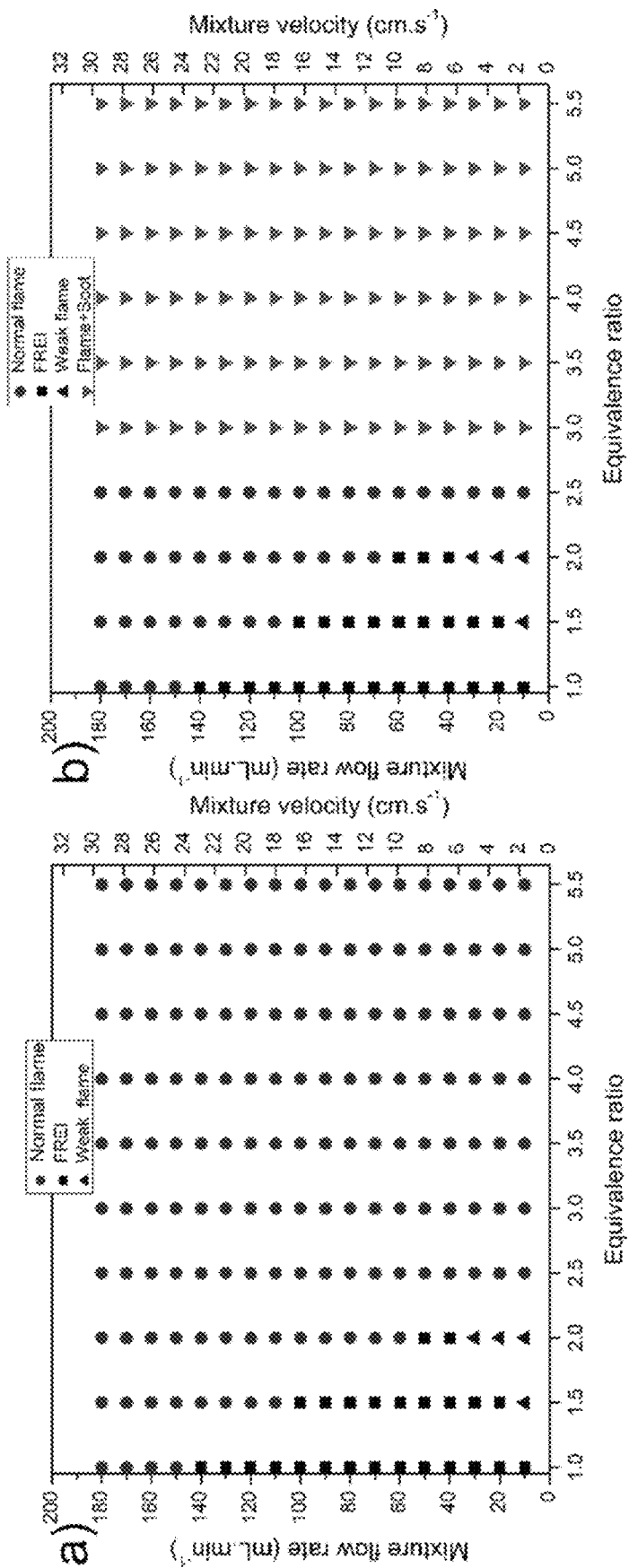
FIG. 2 is a regime map showing weak flame, FREI, normal flame and flame with soot formation regions for propane/air microcombustion at a) 900° C. and b) 1000° C.
Figure 3:
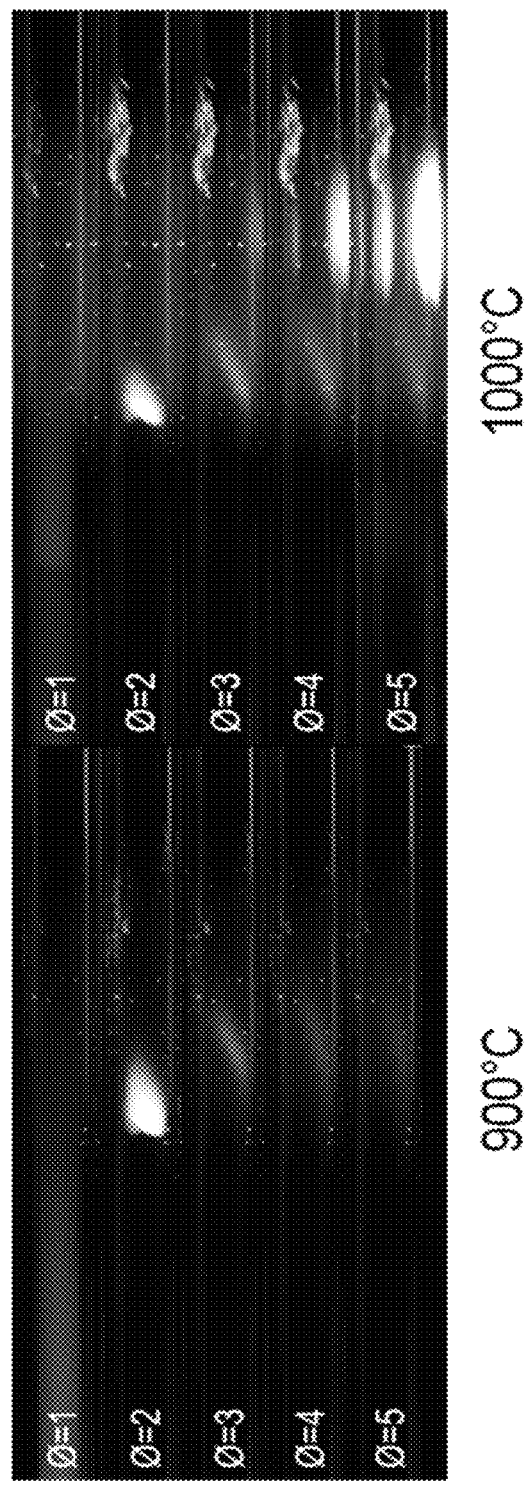
FIG. 3 is a representative direct image of propane/air flame and soot responses with fixed 100 mL/min-1 total flow rate at 900° C. and 1000° C. and equivalence ratios from 1 to 5.

FIG. 2 shows the microcombustion flame characteristics at wall temperatures of 900° C. and 1000° C. The Flame with Repetitive Extinction and Ignition (FREI) regime for this 3.6 mm micro flow reactor with controlled temperature profile was observed at stoichiometry for mixture flow rates between 10 and 140 mL/min (velocities between 1.6 and 23 cm/s), which is similar to previously reported work on a 2 mm micro flow reactor with controlled temperature profile. The velocity range over which the FREI existed narrowed as the equivalence ratio increased to the point where no FREI regime was observed at an equivalence ratio of 2.5. The main observation from FIG. 2a is that at a wall temperature of 900° C., no soot was observed at any velocity even at an equivalence ratio of 5.5. No soot formation was also observed at an equivalence ratio of 5.5 with a wall temperature of 750, 800 or 850° C. at any of the flow rates investigated. The regime maps at these lower temperatures were similar to the regime map at 900° C. (FIG. 2a), and are not repeated. Similar regimes for the normal flame, FREI and weak flame were observed when the wall temperature was increased to 1000° C. However, radiation from soot was observed above an equivalence ratio of 2.5, as shown in FIG. 2b. Further investigation revealed that the sooting characteristics at 950° C. were the same as shown in FIG. 2b at 1000° C. Representative direct images of the propane/air flame and soot responses for a fixed total flow rate of 100 mL/min are shown in FIG. 3 for equivalence ratios (Φ) from 1 to 5 and maximum wall temperatures of 900 and 1000° C. The results shown in FIGS. 2 and 3 indicate that if the micro flow reactors wall temperature is in the range of 750-900° C. soot formation does not occur for equivalence ratios 1-5.5 under the experimental procedure used here, providing a wide operating range for the mT-FFC.

Figure 4:
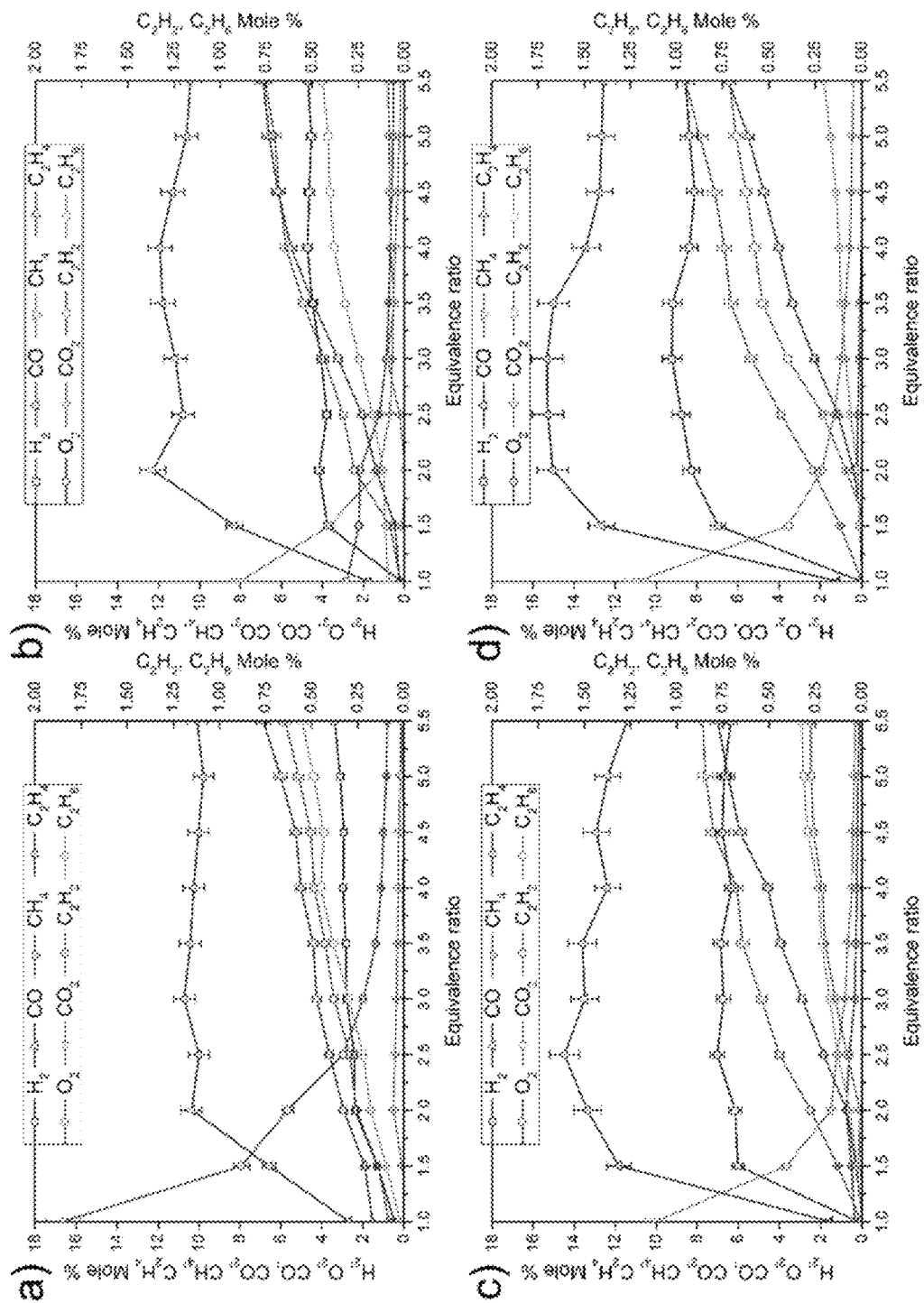
FIG. 4 is a graph of propane/air microcombustion exhaust species at equivalence ratios 1-5.5 and maximum wall temperature of a) 750° C., b) 800° C., c) 850° C. and d) 900° C.

With no soot observed for equivalence ratios 1-5.5 at wall temperatures in the range of 750-900° C., the microcombustion exhaust of propane/air was investigated at 750, 800, 850 and 900° C. FIG. 4 shows the results for a fixed propane flow rate of 2 mL/min. As shown in FIG. 4a, the $H_2$ in the exhaust remained just below 3.6 mol % at a wall temperature of 750° C. The $H_2$ concentration increased quickly below an equivalence ratio of 2, but was fairly stable at higher equivalence ratios. The CO concentration showed a similar trend, but the concentration remained between 9.8 and 10.7 mol % above an equivalence ratio of 2. Other hydrocarbons were also observed throughout the range and increased with equivalence ratio. Increasing the wall temperature has a significant impact on the exhaust composition as shown by comparing FIG. 4a-d. As the wall temperature increased, the exhaust composition indicates a transition from incomplete combustion with CO, $CH_4$, $C_2H_4$ and $C_2H_6$ as the 4 major species besides $N_2$, toward smaller hydrocarbons with major species of $H_2$, CO, $CH_4$ and $C_2H_2$. This is expected as the propane oxidation mechanism proceeds from $C_2H_6$ to $C_2H_4$ and finally to $C_2H_2$. At higher equivalence ratios the presence of $C_2$ species results from propane breaking down to smaller hydrocarbons. The reactions proceed towards syngas, carbon dioxide, water and methane, which are the main byproducts expected from chemical equilibrium of propane/air under fuel-rich conditions. A peak $H_2$ concentration of 9.2 mol % and CO concentration of 15.3 mol % occurred at an equivalence ratio of 3 with a wall temperature of 900° C. as shown in FIG. 4d. The exhaust composition for a wall temperature of 950° C. and 1000° C. were investigated in the non-sooting region for equivalence ratios from 1-2.5. The composition of the syngas in the exhaust at 950° C. and 1000° C. was comparable to the results at 900° C., was within experimental uncertainty and is therefore not shown here.

Figure 5:
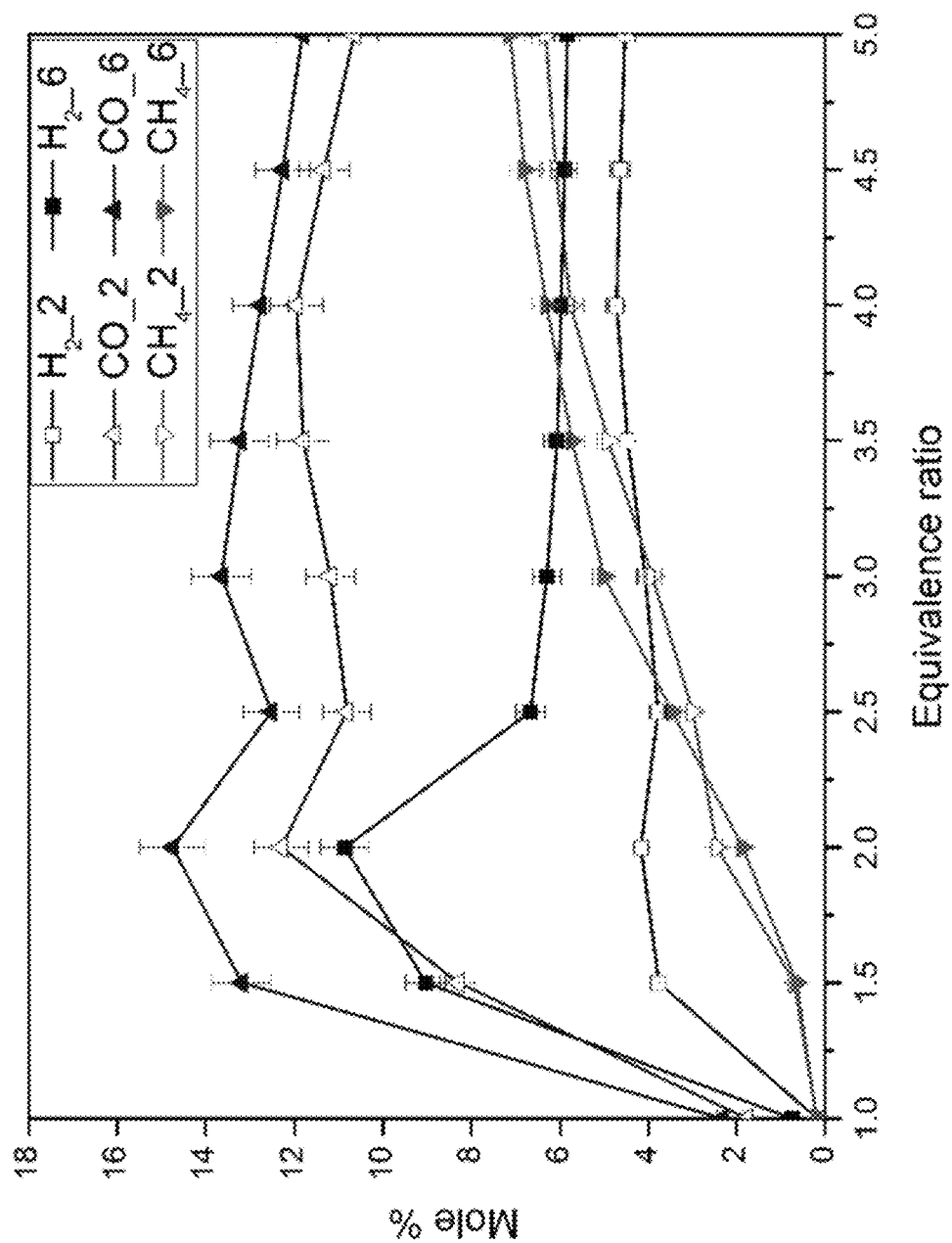
FIG. 5 is a graph of propane/air microcombustion exhaust comparison of $H_2$, CO and $CH_4$ at equivalence ratios 1-5 at fixed propane flow rate of 2 mL/min$^{-1}$ and 6 mL/min$^{-1}$.

Increasing the wall temperature has a significant effect on the exhaust composition as just described. The local flame temperature can also be increased by increasing the flow rate. To investigate the effect of local flame temperature the propane flow rate was increased from 2 to 6 mL/min and held constant while varying the equivalence ratio. FIG. 5 shows a comparison of the $H_2$, CO and $CH_4$ concentration in the exhaust at fixed propane flow rates of 2 and 6 mL/min at a wall temperature of 800° C. Open symbols indicate 2 mL/min of fixed fuel flow rate and filled symbols indicate 6 mL/min of fixed fuel flow rate. The impact of increasing the flow rate on the syngas concentration was significant as the $H_2$ concentration increased from 4.2 mol % to 10.9 mol % and the CO concentration from 12.4 mol % to 14.7 mol % at an equivalence ratio of 2. A corresponding decrease in the higher hydrocarbons occurred as the flow rate increased.

Figure 6:
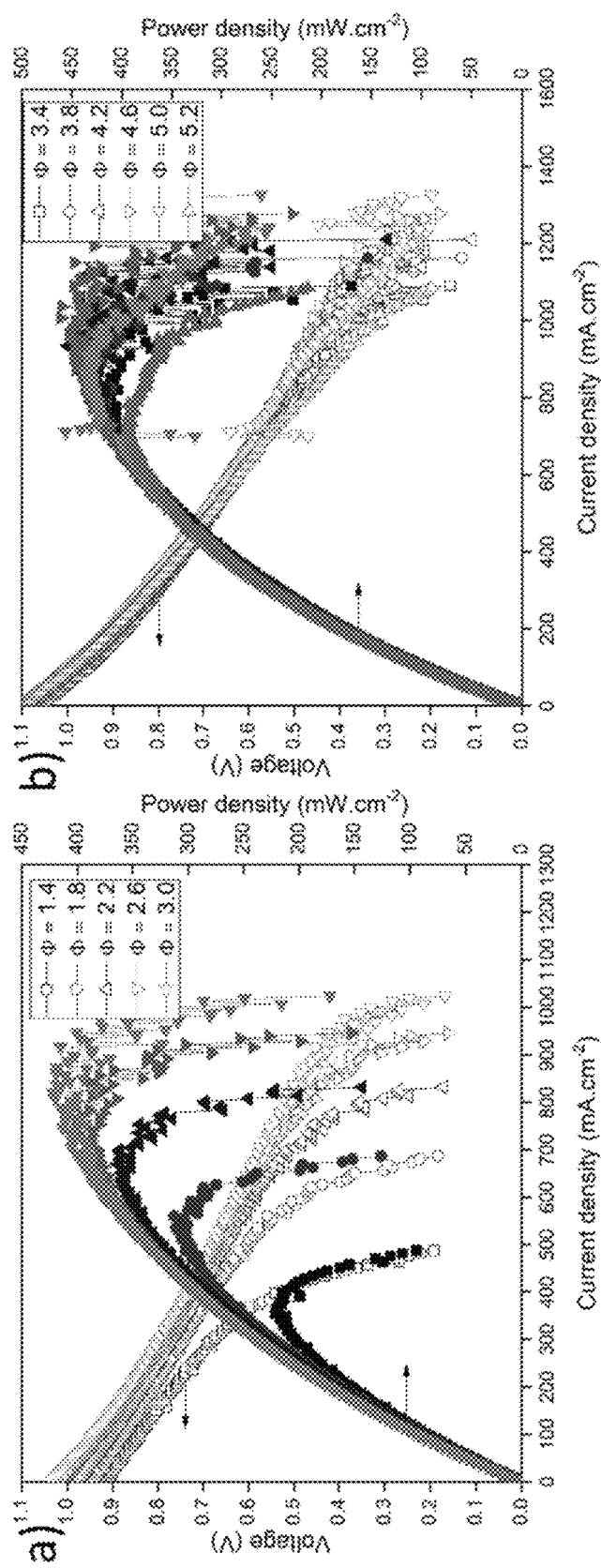
FIG. 6 is a graph of mT-FFC polarization and power density at fixed propane flow rate of 2 mL/min$^{-1}$, 800° C. and equivalence ratios from a) 1.4-3.2 and b) 3.4-5.2.

After characterizing the microcombustion exhaust composition the mT-FFC was tested at 800° C. with a fixed propane flow rate of 2 mL/min and equivalence ratios ranging from 1.4 to 5.2. FIG. 6 shows the polarization and power density curves. To improve the clarity of FIG. 6 only the polarization and power density curves for equivalence ratios of 1.4, 1.8, 2.2, 2.6, 3.0, 3.4, 3.8, 4.2, 4.6, 5.0 and 5.2 are shown. FIG. 6a shows a significant (56%) increase in power density from a maximum power density of 220 mW/cm² at an equivalence ratio of 1.4 up to 343 mW/cm² at an equivalence ratio of 2. This occurred despite only increasing the incoming fuel concentration by 28% between an equivalence ratio of 1.4 and 2. The source of this drastic increase in power density as the equivalence ratio increases is attributed to the increase in $H_2$ and CO concentrations, as shown in FIG. 4b. The power density increased further up to a peak of 460 mW/cm² at an equivalence ratio of 4.6. Overall, the power density increased 109% as the equivalence ratio increased from 1.4 to 4.6. However, more than half of the increase occurred between an equivalence ratio of 1.4 and 2. FIG. 6b shows a much smaller and slower increase in power density between an equivalence ratio of 3.4 and 4.6. Beyond the optimal power density at an equivalence ratio of 4.6, the power density began to decline and there was evidence of carbon coking in the mT-FFC. Investigation of the exhaust species in FIG. 4b indicate that the CO concentration was decreasing above an equivalence ratio of 4.6 while the $H_2$ concentration was essentially constant. The presence of $CH_4$, $C_2H_2$, $C_2H_4$ and $C_2H_6$ are likely responsible for the carbon coking observed which can be mitigated by operating at lower equivalence ratios. Despite the carbon coking, the mT-FFC was able to achieve a high power density on this initial test without optimization of the microcombustion exhaust or fuel cell providing motivation for further investigation.

Figure 7:
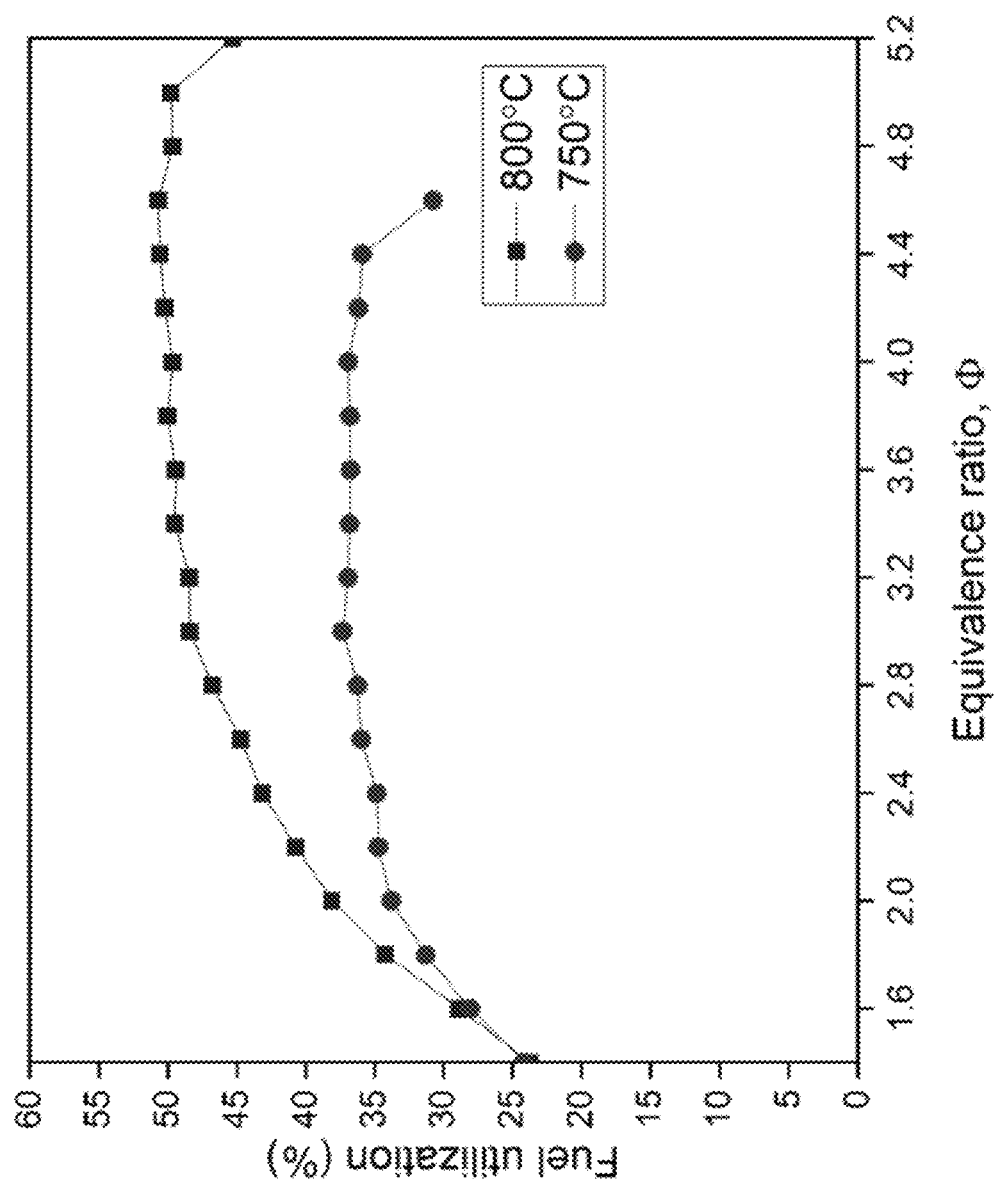
FIG. 7 is a graph of mT-FFC fuel utilization at fixed propane flow rate of 2 mL/min$^{-1}$, equivalence ratios from 1.4-5.2, a fuel cell operating voltage of 0.5V and temperature of 750° C. and 800° C.

After observing an optimal equivalence ratio, beyond which carbon deposition became apparent at 800° C., the mT-FFC was investigated at 750° C. The results are not repeated here as they are similar to the results shown in FIG. 6. The power density decreased slightly as expected due to the decrease in electrode kinetics with decreasing temperature and reduced $H_2$ and CO concentration (shown if FIG. 4a). However, the optimal power density of 337 mW/cm² occurred at an equivalence ratio of 3.2. The effect of carbon deposition became apparent at much lower equivalence ratios which could be due to some deterioration in the electrode, which occurred during testing at 800° C. and high equivalence ratios, but could also be due to a reduction in $H_2$ concentration. FIG. 7 provides a comparison of the fuel utilization of the two tests. The fuel utilization accounts for the amount of fuel actually utilized (i.e., fuel remaining after microcombustion) in the electrochemical reactions compared to the initial fuel available (i.e., incoming propane). The fuel utilization can be defined by Eq. (2).

$$\varepsilon_{F.U.} = \frac{\text{Fuel consumed in } SOFC}{\text{Total fuel available before microcombustion}} \quad (2)$$

The fuel utilization can be calculated with Eq. (3) below:

$$\varepsilon_{F.U.} = \frac{i}{\frac{V_{fuel}}{V^M} \frac{1 \times 10^{-6}}{60} nF} \quad (3)$$

In Eq. (3), i [A] is the current being drawn from the SOFC at 0.5 V, $V_{fuel}$ [mL/min] is the total flow rate of propane, $V^M$ [m³/mol] is the molar volume at standard conditions, which is $2.24 \times 10^{-2}$ m³/mol, n is the moles of electrons per moles of fuel (i.e., 20 for propane) and F is Faradays constant. There are also numerical constants in Eq. (3) for unit conversion. The potential for high fuel utilization from this microcombustion mT-FFC power generation concept is evident by the peak fuel utilization of 50.7% at 800° C. and 0.5 V. For microcombustion based power generation, electrical efficiency often does not exceed 4% in heat engines. Optimization of the mT-FFC microstructure and microcombustion exhaust species, a larger active area, and a well-designed heat recovery system may allow for high fuel utilization and electrical efficiency for this concept.

Figure 8:
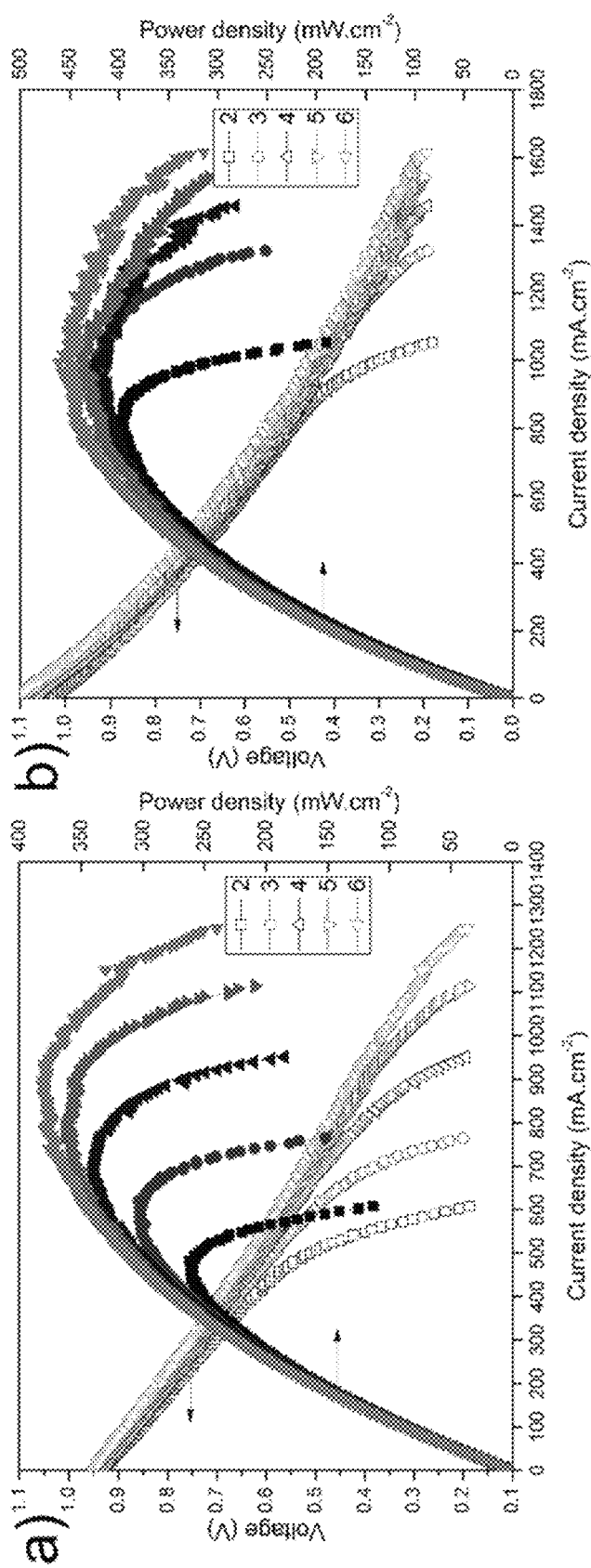
FIG. 8 is a graph of mT-FFC polarization and power density at fixed propane flow rates of 2, 3, 4, 5 and 6 mL/min$^{-1}$ and equivalence ratios of a) 1.4 and b) 2.5.

A final test on the mT-FFC was conducted to investigate the impact of changes in flow rate on the mT-FFC performance at a fixed equivalence ratio. FIG. 8a shows the change in fuel cell performance at different propane flow rates of 2, 3, 4, 5, and 6 mL/min and a fixed equivalence ratio of 1.4. Similar results are shown for a fixed equivalence ratio of 2.5 in FIG. 8b. Both results showed an increase in power density as the flow rate increased. While increasing the flow rate generally provides an increase in SOFC power density due to more fuel available for the fuel cell, there is a distinction between FIGS. 8a and 8b. FIG. 8a shows a 45% increase in peak power density by increasing the propane flow rate from 2 to 6 mL/min at an equivalence ratio of 1.4. In comparison the peak power density increased by less than 16% at an equivalence ratio of 2.5. The reason for the significant difference in power density increase at these two equivalence ratios can be explained with the data shown in FIG. 5. The significant increase in $H_2$ (140% increase) and CO (59% increase) (FIG. 5) at an equivalence ratio of 1.5 helps explain the significant change in mT-FFC peak power density observed in FIG. 8a. $H_2$ kinetics in the anode are 2-3 times faster than CO kinetics and certainly much faster than hydrocarbon kinetics which explains the steep increase in performance at an equivalence ratio of 1.5. In comparison, the increase in $H_2$ (76% increase) and CO (25% increase) was less significant at an equivalence ratio of 2.5 (FIG. 5), and the presence of higher hydrocarbons can slow the reactions which explains the results in FIG. 8b.

After operating in propane microcombustion exhaust (i.e., premixed fuel/air are fed to the micro flow reactor and the exhaust passes to the anode of the mT-FFC), the fuel was switched to propane only (i.e., no air was supplied for microcombustion to occur in the micro flow reactor) at flow rates of 2, 3, 4, 5 and 6 mL/min. A comparison of the mT-FFC performance in propane and propane microcombustion exhaust was sought, but the fuel cell cracked within 5 minutes after using pure propane at a flow rate of 4 mL/min due to rapid carbon deposition on the anode. This result was confirmed in multiple tests with a new SOFC indicating that the carbon deposition was not a result of the previous testing in microcombustion exhaust. Direct use of propane is ideal, but not possible due to rapid carbon deposition. However, testing in microcombustion exhaust was sustained for more than 5 h during the testing described here without any cracking of the fuel cell observed.

From this initial work, it is evident that the syngas concentration in the exhaust is temperature dependent and can be optimized with changes to the wall temperature and flow rate. Long term stable performance of a microcombustion based mT-FFC at high equivalence ratios is possible without soot formation as demonstrated, but the presence of $CH_4$, $C_2H_2$, $C_2H_4$ and $C_2H_6$ will need further investigation. Long-term, direct use of the $C_2$ species will either require a change in anode material or use of the water gas shift reaction to prevent carbon deposition on the anode. For example, Ni+YSZ can be replaced with a Cu-ceria anode, because Cu is a poor catalyst for C—H bond activation and graphite formation. Ceria has high activity for hydrocarbon oxidation, high ionic conductivity and stable operation with methane, ethane, butane, 1-butene, and toluene has been achieved with no carbon deposition. Alternatively, if the wall temperature and flow rate are optimized to limit the concentration of the hydrocarbons then steam reforming on the Ni+YSZ anode is possible because of the presence of water in the exhaust. In one study with 1000 ppm of $C_2H_4$ and 3 mol % water at 800° C., no carbon deposition was observed due to steam reforming on Ni+YSZ. Equation (4) shows an example for $CH_4$ steam reforming.

$$CH_4+H_2O \rightarrow CO+3H_2 \tag{4}$$

In the present invention, an upstream quartz tube has been used to study controlled propane microcombustion over equivalence ratios ranging from 1 to 5.5 and temperatures ranging from 750° C. to 1000° C. The mT-FFC downstream of the microcombustion was monitored. Microcombustion was observed through the quartz tube and the exhaust products were measured with a gas chromatograph. The mT-FFC showed a promising peak power density of 460 mW/cm² and the potential for high fuel utilization, which exceeded 50% at an equivalence ratio of 4.6. The present micro flow reactor with controlled temperature profile was demonstrated as a possible non-catalytic fuel reformer for hydrocarbons to syngas. Syngas formation was shown to be temperature dependent which makes variations of the wall temperature, flow rate and equivalence ratio important. More work could be performed to optimize the exhaust composition to increase the mT-FFC performance and long-term operation. Peak syngas concentrations achieved in the present invention are still well below chemical equilibrium predictions, which warrants further investigation. Soot formation in the micro flow reactor was shown to decrease drastically between a wall temperature of 900 and 950° C. with propane/air flames. No soot formation at an equivalence ratio of 5.5 was demonstrated for wall temperatures between 750-900° C.

Example 2

In this study, synthesis gas generation from thermal partial oxidation of ethane/air is investigated at high fuel/air ratios and at low temperature (<1000° C.). Studies with heat recirculation and fuel-rich combustion reforming in this temperature range are rare, but matching this temperature with the operating temperature of the SOFC has the advantage of reducing energy destruction. A small diameter micro flow reactor with controlled temperature profile was utilized, which is considered microcombustion due to the reactor size. In this work, the flame dynamics are characterized with flame visualization and the reforming is characterized with gas chromatography (GC). A mT-SOFC is investigated at 800° C. with varying equivalence ratios and flow rates. Variations in the mT-SOFC polarization are linked to the synthesis gas composition and flame dynamics. The fuel utilization is reported and a comparison is made between thermal partial oxidation and direct use of pure 112 in the mT-SOFC.

Experimental Setup

Microcombustion Characterization

Figure 10:
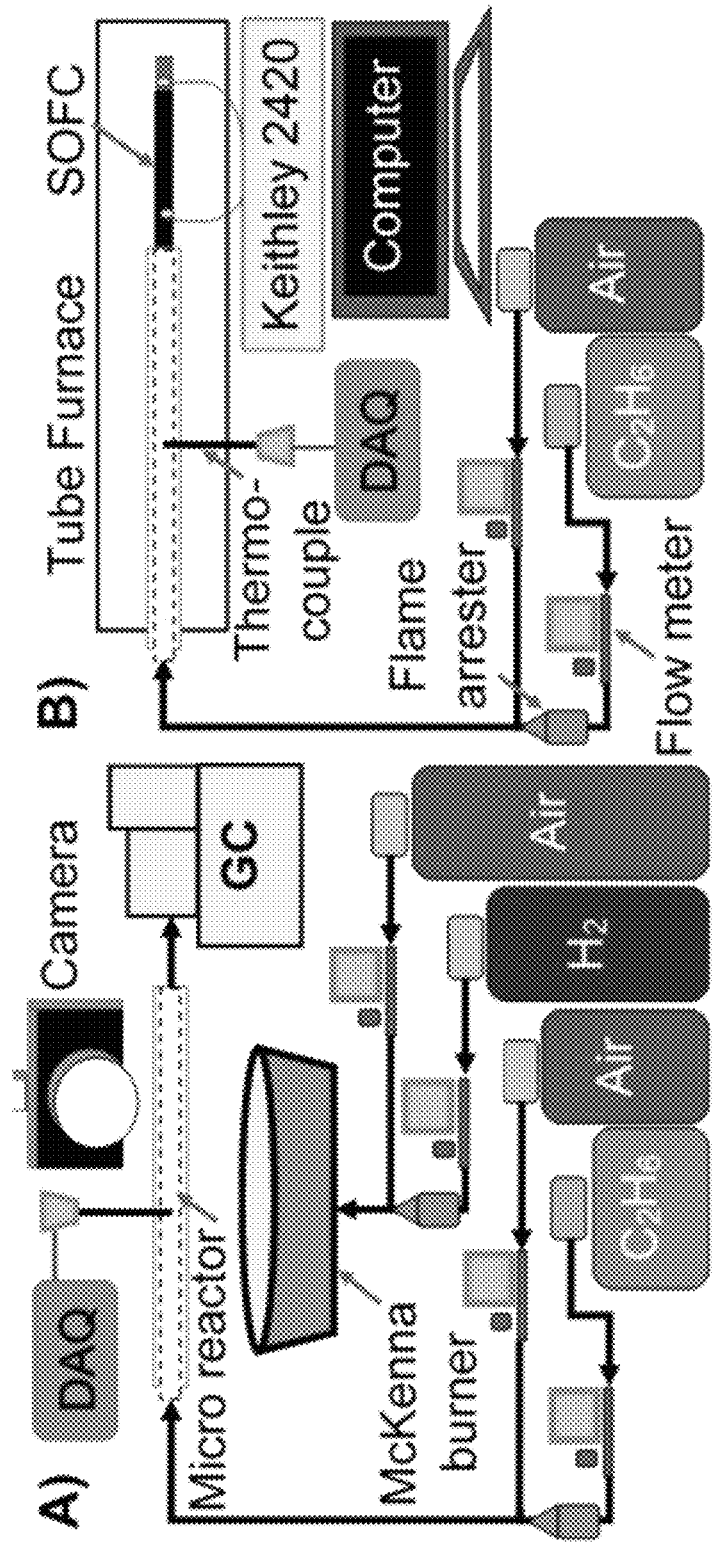
FIG. 10 is a schematic showing a second experimental setup for A) characterization of microcombustion and exhaust composition and B) testing of mT-SOFC in microcombustion exhaust.

Prior to testing with the mT-SOFC, combustion of ethane/air in the micro flow reactor with controlled temperature profile was characterized using a flat flame burner for flame visualization and for exhaust composition characterization. The experimental setup for the combustion characterization is shown in FIG. 10A. The flow rates of ethane/air were controlled with mass flow controllers with the total flow rate fixed and the equivalence ratio, Φ, varying between 1.0 and 5.0. Equivalence ratio is defined in Eq. (1) where $n_{fuel}/n_{air}$ is the molar fuel/air ratio and $n_{fuel}^s/n_{air}^s$ is the fuel/air ratio required for stoichiometric combustion. Total flow rates (fuel and air) of 10 mL·min⁻¹, 50 mL·min⁻¹, 100 mL·min⁻¹, 150 mL·min⁻¹, and 200 mL·min⁻¹ were investigated. Table 2 shows the flow rates of ethane/air for the case of a total fixed flow rate of 10 mL·min⁻¹. A flame arrestor was applied downstream of the mass flow controller to prevent flashback. The mass flow controllers were connected to the micro flow reactor with tubing. The internal diameter of the micro flow reactor was 3.6 mm. The temperature of ethane/air was at ambient temperature prior to entering the micro flow reactor. Due to external heating by the flat flame burner (heated with combustion of hydrogen/air), the maximum internal wall temperature of the micro flow reactor can be controlled. Three different maximum wall temperatures were investigated in this study; 800° C., 900° C. and 1000° C. The temperature of the ethane/air increased until it approached the maximum wall temperature. The flame stabilized in the reactor near the point of maximum wall temperature. Flow rates of hydrogen/air were controlled with mass flow controllers and premixed prior to entering the flat flame burner. The flow rate of each was adjusted so that the maximum internal wall temperature of the micro flow reactor reached 800° C., 900° C. and 1000° C. A K-type thermocouple was placed on the bottom inside wall of the micro flow reactor to measure the temperature profile. National Instruments data acquisition (DAQ in FIG. 10) was utilized to obtain the temperature data measured. A digital camera (Nikon D300S) was utilized to obtain images of the flame and thermal radiation from soot in the reactor. The images were used to construct a regime map for ethane/air microcombustion. After obtaining these images for each flow rate, equivalence ratio and temperature, the exhaust composition was investigated with a Shimadzu GC-2010 Plus with BID-2010 Plus detector. The concentration of 112, $N_2$, $O_2$, CO, $CO_2$, $CH_4$, $C_2H_2$, $C_2H_4$ and $C_2H_6$ were measured for different flow rates, equivalence ratios and temperatures.

$$\Phi = \frac{n_{fuel}/n_{air}}{n_{fuel}^S/n_{air}^S}$$

TABLE 2

Ethane/air flow rates for different equivalence ratios for the case of a fixed total flowrate of 10 mL · min$^{-1}$

| Equivalence ratio, $\Phi$ | Ethane flow rate (mL · min$^{-1}$) | Air flow rate (mL · min$^{-1}$) | Total flow rate (mL · min$^{-1}$) |
| --- | --- | --- | --- |
| 1.0 | 0.57 | 9.43 | 10 |
| 1.5 | 0.83 | 9.17 | 10 |
| 2.0 | 1.08 | 8.92 | 10 |
| 2.5 | 1.31 | 8.69 | 10 |
| 3.0 | 1.53 | 8.47 | 10 |
| 3.5 | 1.75 | 8.25 | 10 |
| 4.0 | 1.95 | 8.05 | 10 |
| 4.5 | 2.14 | 7.86 | 10 |
| 5.0 | 2.32 | 7.68 | 10 |

Anode supported mT-FFCs were fabricated as follows. A mixture of nickel oxide and yttria-stabilized zirconia (NiO+YSZ, 6:4 w/w) was prepared, extruded, dried and sintered to 1100° C. for 2 hours. The pre-sintered tubes were then coated in YSZ electrolyte via dip coating, dried and sintered to 1400° C. for 4 hours. A samaria-doped ceria (SDC, $Sm_{0.20}Ce_{0.80}O_{2-x}$) buffer layer [53] was applied to the electrolyte via wet powder spray and sintered to 1350° C. for 4 hours. A LSCF+SDC (($La_{0.60}Sr_{0.40})_{0.95}Co_{0.20}Fe_{0.80}O_{3-x}$+ SDC, 7:3 w/w) cathode was dip coated onto the buffer layer, dried and sintered to 1100° C. for 4 hours. The final tubes had an internal diameter of 2.2 mm, an external diameter of 3.2 mm and a cathode active area of 4.07 cm$^2$. Silver paste was applied to the cathode for current collection and gold paste was applied to the anode for current collection as shown in a previously reported configuration. Silver wire was wrapped on the anode and cathode for current collection and to measure the voltage different across the mT-FFC using the four probe technique. The mT-FFC was sealed to the same micro flow reactor with controlled temperature profile just described in the previous section. Testing occurred in a split tube furnace. A schematic of the experimental setup is shown in FIG. 10B. The current-voltage method was conducted with a Keithley 2420 sourcemeter interfaced with a computer. A K-type thermocouple measured the maximum wall temperature on the inside of the micro flow reactor. The furnace temperature set point and measured maximum wall temperature were both 800° C. The fuel cell characterization was conducted at 800° C. only as the operating temperature of SOFCs with LSCF cathode are typically in the range of 450-800° C. The same fixed total flow rates investigated in the microcombustion characterization experiments, i.e., 10 mL·min-1, 50 mL·min-1, 100 mL·min-1, and 150 mL·min-1, were investigated with the mT-FFC. A total flow rate of 200 mL·min-1 was not investigated because the fuel utilization would be low for the fuel cell active area available. Flow rates of ethane and air were controlled with mass flow controllers. The same flow rates used in the microcombustion characterization experiments (shown in Table 2) were utilized for the microcombustion with mT-FFC characterization.

Results

Microcombustion Reforming Characterization

Figure 11:
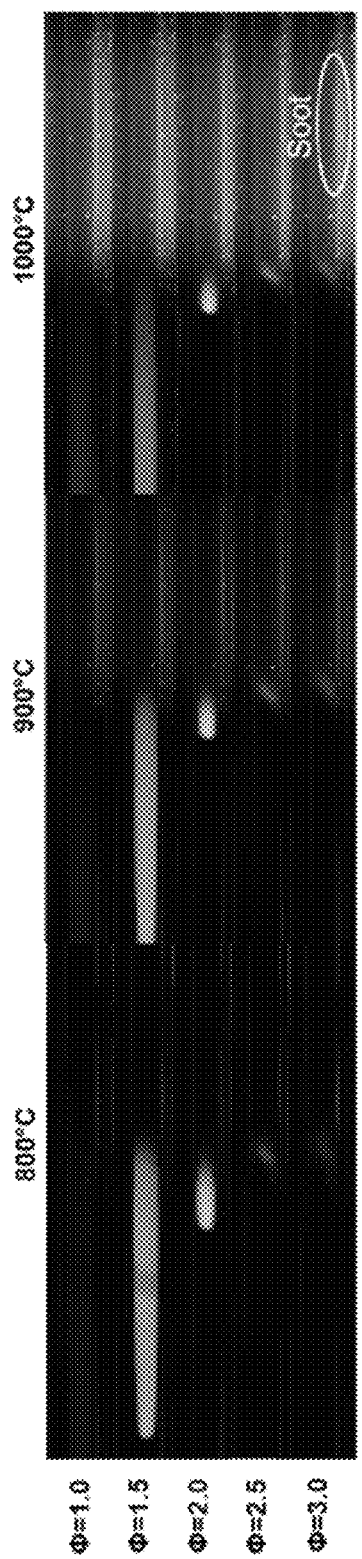
FIG. 11 is a series of representative direct images of ethane/air flames at a total flow rate of 50 mL·min$^{-1}$ for equivalence ratios, Φ, from 1-3 and wall temperatures from 800-1000° C.

In order to link the microcombustion reforming to the mT-SOFC performance, the microcombustion was characterized first. The flame was characterized with flame visualization. The results are shown in FIG. 11 for a total flow rate of 50 mL·min$^{-1}$, maximum wall temperatures of 800° C., 900° C., and 1000° C. and for equivalence ratios ranging from 1 to 3. As shown, at 800° C. and an equivalence ratio of 1.0, 1.5 and 2.0, Flame with Repetitive Extinction and Ignition (FREI) is observed with the ignition occurring near the maximum wall temperature and extinction occurring upstream. At an equivalence ratio of 1.0, extinction occurs near the inlet of the micro flow reactor near ambient temperature. At 800° C. and an equivalence ratio of 2.5 and 3.0, the FREI regime was not observed, but normal flame was. These results were similar at maximum wall temperatures of 900° C. and 1000° C. with one important difference. At a wall temperature of 1000° C. and an equivalence ratio of 3.0, thermal radiation from soot was observed. Soot particles continued to build on the wall after the first soot was observed and higher equivalence ratios accelerated the rate of soot particle buildup. As soot particles will damage a SOFC downstream of the reaction zone, this limits the performance region for the SOFC unless the soot is filtered. The significance of this result is that soot formation was not observed at an equivalence ratio of 3.0 (for wall temperatures of 800° C. and 900° C.), which is a much higher equivalence ratio than the typical onset of soot formation. Soot often forms at equivalence ratios between 1.65 and 1.71 for premixed ethane and air. Higher equivalence ratios up to 5.0 were investigated at 800° C. and 900° C. with no soot formation observed. As soot formation has a strong temperature dependence, the lower temperatures (<1000° C.) appear to be responsible for the lack of soot formation and need further exploration for SOFC studies.

Figure 12:
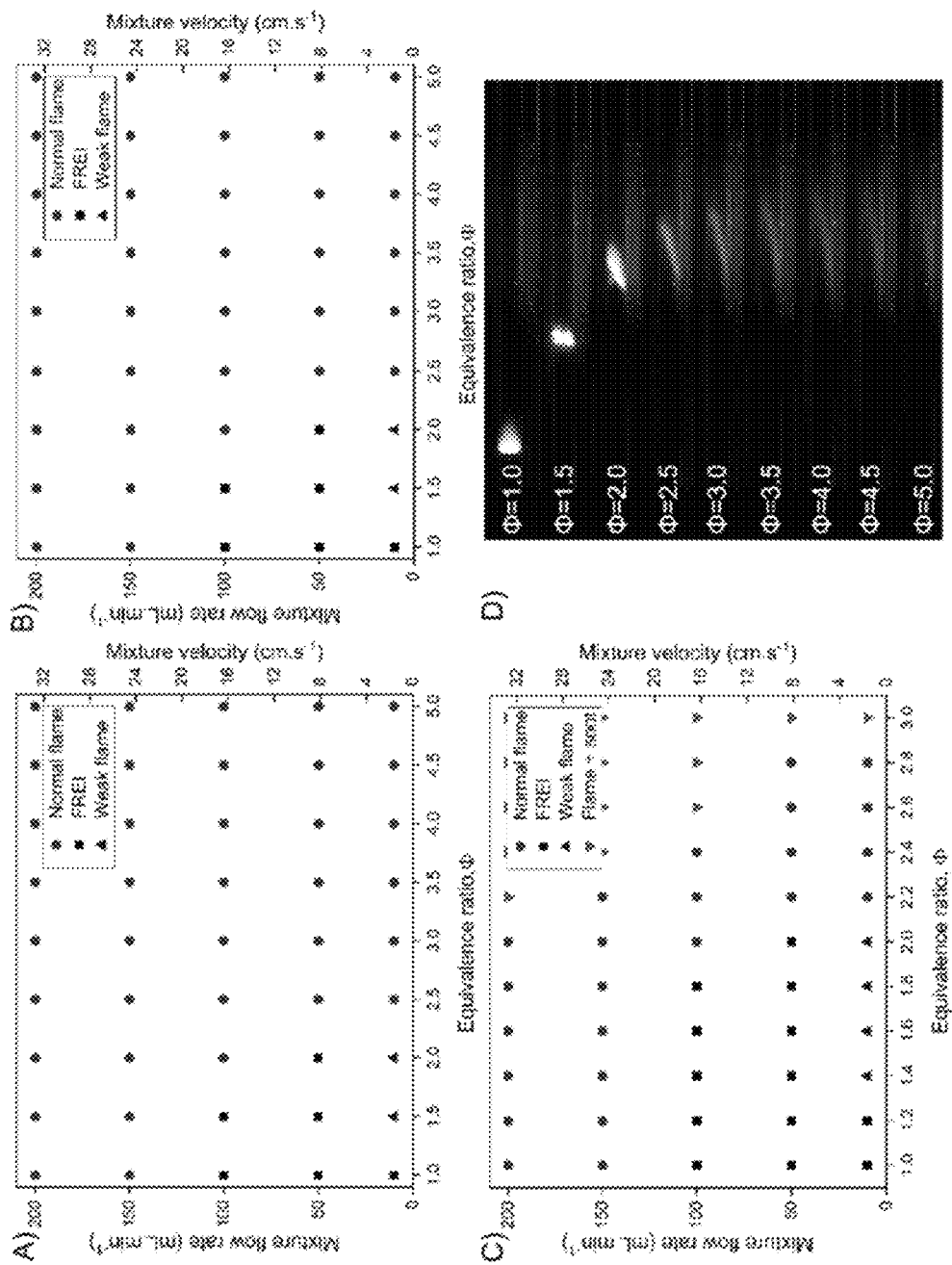
FIG. 12 is a series of regime maps showing the regions for weak flame, FREI, normal flame and normal flame with soot for ethane/air at equivalence ratios, Φ, from 1-3, total flow rates from 10-200 mL·min$^{-1}$ and temperatures of A) 800° C., B) 900° C., and C) 1000° C. D) Direct images at different equivalence ratios, a wall temperature of 900° C. and at a total flow rate of 200 mL·min$^{-1}$.

After characterizing the microcombustion at a fixed total flow rate of 50 mL·min$^{-1}$, the same visualization experiment was repeated at total flow rates of 10 mL·min$^{-1}$, 100 mL·min$^{-1}$, 150 mL·min$^{-1}$, and 200 mL·min$^{-1}$. The results are summarized on regime maps in FIG. 12. The results for equivalence ratios from 1.0 to 5.0 are shown for a wall temperature of 800° C. in FIG. 12A and for a wall temperature of 900° C. in FIG. 12B. At wall temperatures of 800° C. and 900° C. and a total flow rate of 10 mL·min$^{-1}$, weak flame was observed at an equivalence ratio of 1.5 and 2.0. At total flow rates above 100 mL·min$^{-1}$, FREI was not observed at all and normal flame was observed for all equivalence ratios investigated. Images of normal flame obtained for different equivalence ratios and a total flow rate of 200 mL·min$^{-1}$ are shown in FIG. 12D for a wall temperature of 900° C. At a wall temperature of 1000° C., the results differed because of the onset of soot formation, as previously discussed. The regime map at a wall temperature of 1000° C. is shown in FIG. 12C. Previous research in a micro flow reactor has demonstrated that soot formation decreases or is not observed at higher equivalence ratios when the residence time decreases for n-cetane and iso-cetane fuels. The results reported here indicate the opposite trend in the case of ethane/air, i.e., soot formation was observed at lower equivalence ratios when the residence time decreases. For example, soot formation was observed at an equivalence ratio of 2.2, total flow rate of 200 mL·min$^{-1}$ and a wall temperature of 1000° C., but it was not observed until an equivalence ratio of 3.0 at a total flow rate of 10 mL·min$^{-1}$ (FIG. 12C). This opposite trend may have two possible explanations. First, that higher total flow rates result in faster accumulation of soot particles and the onset of the luminosity observed. Second, that the higher total flow rates result in higher local temperature of the flame, which results in soot formation at lower equivalence ratios as the temperature increases. The second possibility is supported by the fact that higher temperatures (1000° C.) resulted in soot formation at lower equivalence ratios (FIG. 11).

After characterizing the microcombustion flame and the region of soot formation, the exhaust composition of the micro flow reactor was characterized with a GC as shown in FIG. 13. The exhaust composition was characterized to understand how the composition varies with temperature (800° C., 900° C., and 1000° C.) and total flow rate of fuel and air (10 and 50 mL·min$^{-1}$). These low flow rate conditions were chosen for characterization because the highest conversion efficiency of the fuel to power in the fuel cell was expected at the lowest flow rates. The exhaust composition at a maximum wall temperature of 800° C. is shown in FIGS. 13A and 13D. As shown, at an equivalence ratio of 1.0, the concentration of $CO_2$ is high and evidence of incomplete combustion exists with high concentration of $O_2$ (~1%) even at an equivalence ratio of 1.5. The concentration of I-1$_2$ and CO increase and peak at equivalence ratios between 2.0-3.0. At higher equivalence ratios, C2114 and $CH_4$ are the main hydrocarbons present in the exhaust with the concentration of $C_2H_6$ becoming more significant at equivalence ratios above 3. These general trends were observed at both flow rates, but with some differences. At a total flow rate of 50 mL·min$^{-1}$, the $CO_2$ concentration was higher and the $O_2$ concentration was lower than at a total flow rate of 10 mL·min$^{-1}$ for equivalence ratios from 1 to 2.5. This is evidence that the reactions were more complete as $O_2$ is one of the initial reactants and $CO_2$ is one of the final products. The concentration of I-1$_2$ increased significantly from 6.0% to 12.9% at an equivalence ratio of 2.5 as a result of increasing the flow rate. Similarly, CO concentration increased from 12.8% to 15.3% at the same equivalence ratio. Although higher concentrations of synthesis gas are possible at higher flow rates, the fuel utilization efficiency would have been low for the mT-FFC used in this study, as will be discussed further in Section 3.2. At equivalence ratios of 2.5 and less, there was also evidence of a decrease in $C_2H_4$ concentration and an increase in $C_2H_2$ concentration. This result is further evidence of more complete combustion as the low temperature (<1200° C.) reaction pathway for many hydrocarbons proceeds with the breakdown of $C_2H_6$ to $C_2H_4$ to $C_2H_2$ before forming CO. As a result, it appears that the increase in flow rate has the effect of increasing the local temperature in the flame region, which results in more complete combustion reactions. Increasing the maximum wall temperature to 900° C. had a similar effect on the reactions resulting in an increase in $H_2$, CO, $CO_2$, $CH_4$ and $C_2H_2$ concentrations and decreases in $O_2$, $C_2H_6$ and $C_2H_4$ concentrations (FIGS. 13B and 13E). A peak CO concentration of 16.1% and a peak $H_2$ concentration of 17.4% resulted. These concentrations of $H_2$ and CO are higher than the previously reported study using ethane/air shown in Table 2, indicating significant reforming to synthesis gas. Despite the increasing $C_2H_2$ concentration at 900° C. and high equivalence ratios, no soot was observed, as shown in FIG. 11. $C_2H_2$ is considered an important precursor of soot particle formation. However, the increasing $C_2H_2$ concentration is likely linked with the soot formation observed at a maximum wall temperature of 1000° C. Due to the possibility of forming soot, only the exhaust at equivalence ratios from 1.0 to 2.2 were analyzed with the GC at 1000° C., as shown in FIGS. 13C and 13F.

Flame-Assisted Fuel Cell Performance Characterization

After analyzing the microcombustion, the mT-SOFC was attached to the micro flow reactor and the open circuit voltage (OCV) was monitored. A maximum wall temperature of 800° C. was investigated. Since the synthesis gas concentration peaked at equivalence ratios between 2.0-3.0, equivalence ratios from 1.5 to 3.0 were investigated. After reducing the mT-SOFC in hydrogen, ethane/air mixture at an equivalence ratio of 3.0 was initially selected as the highest $H_2$ concentration occurred at that condition and a stable OCV resulted. Upon reducing the equivalence ratio to 1.5, the OCV reduced as expected due to the low concentration of $H_2$ and CO in the exhaust at the lower equivalence ratio. However, the OCV became unstable with fluctuations as high at 0.01 V occurring for each sample taken. These fluctuations are shown in FIG. 14A and a detailed view in FIG. 14B. Upon increasing the equivalence ratio to 2.0, and thus increasing the $H_2$ and CO concentration, the OCV increased and quickly stabilized again. This result appears to be linked to the FREI regime as evidenced by the regime map in FIG. 12A and the images shown in FIG. 14C. Stable normal flames exist at equivalence ratios of 2.0, 2.5 and 3.0, but FREI is observed at an equivalence ratio of 1.5. The FREI may have two effects on the mT-SOFC. First, it can result in periodic variations in the temperature due to the ignition and extinction. To assess this possibility, a K-type thermocouple was used to probe the inside of the mT-SOFC (anode surface) and no noticeable variations in temperature were recorded. A second possibility is that the exhaust composition of the FREI varies periodically due to the ignition and extinction. If the composition varies, this could result in fluctuations in the OCV because the potential is tightly coupled to the concentration of $H_2$ and CO, especially in FFCs. Although the GC could not characterize such rapid fluctuations, the gas composition obtained at an equivalence ratio of 1.5 did have the most variation compared to other equivalence ratios, providing further evidence that FREI results in fluctuations in the exhaust gas composition. To the author's knowledge, this observation about the FREI regime has not been reported before. Further investigations into the exhaust composition variations of the FREI regime are needed.

After analyzing the OCV, polarization curves were obtained at different equivalence ratios (1.5 to 3.0) and different flow rates (10, 50, 100 and 150 mL·min$^{-1}$). The results are shown in FIG. 15. For all of the flow rates investigated, increasing the equivalence ratio resulted in a significant decrease in polarization losses and corresponding increase in power density. This result is clearly linked to the increase in $H_2$ and CO concentration as evidenced by the noticeable decrease in concentration losses at higher equivalence ratios. Instabilities in the polarization curves were observed at a total flow rate of 50 mL·min$^{-1}$ and equivalence ratios of 1.5 and 2.0 as well as a total flow rate of 100 mL·min$^{-1}$ and an equivalence ratio of 1.5. These three conditions were all observed to have FREI, as shown in FIG. 12A. As a result, it is evident that the FREI not only effects the OCV, but it has an important role on the voltage during operation. Voltage fluctuations between readings as high as 0.1 V were recorded, especially at high current densities. For example, note the change in voltage for a total flow rate of 50 mL·min$^{-1}$, equivalence ratio of 1.5 and current density near 200 mA·cm$^{-2}$ shown in FIG. 15B or at a total flow rate of 100 mL·min$^{-1}$, equivalence ratio of 1.5 and current density near 400 mA·cm$^{-2}$ shown in FIG. 15C. These results indicate that the effect of the FREI regime on the mT-SOFC are more significant when concentration losses occur at high current density. This provides an important link between the flame dynamics and the mT-SOFC polarization.

To provide an overall assessment of this microcombustion based mT-FFC, two tests were conducted. The first test investigated the fuel utilization and compared the performance to $H_2$ fuel. First, the fuel utilization ($E_{F,u}$) of the mT-FFC was analyzed. While the fuel utilization can be defined as the electrochemical utilization of the $H_2$, CO and other hydrocarbons available in the exhaust, in this case the fuel utilization is defined more conservatively as the fuel utilization with respect to the incoming ethane fuel. This definition is given in Eq. (2).

$$\varepsilon_{F.U.} = \frac{\text{Fuel consumed in } SOFC}{\text{Total fuel available before microcombustion}} \quad (2)$$

To calculate the fuel utilization, the current generated from the mT-FFC at 0.5 V is compared with the total electrons available from ethane at the given conditions. Eq. (3) is used for this calculation.

$$\varepsilon_{F.U.} = \frac{i}{\frac{V_{fuel}}{V^M} \frac{1 \times 10^{-6}}{60} nF} \quad (3)$$

In Eq. (3), the current at the operating voltage is denoted I [A], the flow rate of ethane is denoted $V_{fuel}$ [mL·min$^{-1}$], the molar volume at standard conditions is $V^M$ [m$^3$·mol$^{-1}$] and the number of electrons per mole of ethane (i.e., 14) is denoted n. Faradays constant, F, and a numerical constant used for conversion are also shown in Eq. (3). The current density at an operating voltage of 0.5 V was taken from the data shown in FIG. 15 for each equivalence ratio and flow rate. The calculated fuel utilizations are shown in FIG. 16 below. As shown, the fuel utilization exceeded 64% at an equivalence ratio of 2.0 and a flow rate of 10 mL·min$^{-1}$. A fuel utilization of 64% is currently the highest fuel utilization reported in the literature for a mT-FFC and marks a significant increase compared to typical fuel utilization values for DFFCs or FFCs which have not exceeded 33%. Increasing the total flow rate increased the fuel available with a fixed fuel cell active area, which resulted in a decrease in fuel utilization. Increasing the equivalence ratio (which also increases the flow rate of ethane compared to the fixed active area) also typically resulted in a decrease in fuel utilization. At a total flow rate of 50 mL·min$^{-1}$, increasing the equivalence ratio from 1.5 to 2.5 actually increased the fuel utilization due to the increase in current density being more significant than the corresponding increase in ethane flow rate.

To assess the microcombustion based mT-FFC further, a comparison was also made with $H_2$ fuel. The flow rate of $H_2$ was calculated so that the total number of electrons available for electrochemical conversion in the mT-SOFC were identical to the number of electrons available in ethane, per unit time. This establishes a $H_2$ baseline for comparison. To make the comparison, $N_2$ was added to the calculated $H_2$ flow so that the total flow rate of $H_2$ and $N_2$ was identical to the total flow rate of ethane/air. $H_2$ and $N_2$ and ethane/air were both fixed at 50 mL·min$^{-1}$. For example, at an equivalence ratio of 2.5, the flow rate of 1-12 was 45.9 mL·min$^{-1}$ and the total flow rate of $H_2$ and $N_2$ was 50 mL·min$^{-1}$. Polarization curves obtained from the mT-FFC operating with ethane/air and $H_2/N_2$ as fuel are compared in FIG. 16B. As shown, the polarization losses in the mT-SOFC with the microcombustion exhaust are higher, which resulted in a decrease in power density compared to $H_2$ fuel. At an operating voltage of 0.7 V the mT-FFC power density in microcombustion exhaust was 236 mW·cm$^{-2}$ compared to 345 mW·cm$^{-2}$ with $H_2/N_2$ at the same total flow rate. Despite the decrease in power density, direct operation with ethane eliminates system complexity and no additional losses associated with steam or water gas shift reforming occur. To assess the stability of the reactions and carbon deposition, a long-term test was conducted at a constant current of 350 mA·cm$^{-2}$ for 60 minutes. Polarization curves were obtained before and after the test and the results are compared in FIG. 17. As shown, the polarization curves were nearly the same with comparable power density occurring before and after the test.

The present invention thus comprises the thermal partial oxidation of ethane/air in a micro flow reactor with controlled temperature profile. Integration of the micro flow reactor with a mT-SOFC allows the characterized microcombustion to be linked with observed variations in the mT-SOFC OCV, polarization, power density and fuel utilization. No soot formation was observed at reactor wall temperatures of 800° C. and 900° C. and equivalence ratios up to 5.0. The lack of soot formation at these conditions allows for direct integration with the mT-SOFC and is a significant result as soot formation has not been thoroughly investigated at these temperatures. Microcombustion reforming was shown to have a strong temperature dependence and is linked to changes in the maximum reactor wall temperature and the total flow rate of fuel and air. Higher wall temperature and higher flow rates result in a significant increase in $H_2$ and CO concentrations. A high $H_2$ concentration of 17.4% and high CO concentration of 16.1% were achieved at 900° C. The FREI upstream of the mT-SOFC resulted in strong variations in the OCV, polarization and power density. Fluctuations in the polarization of up to 0.1 V are reported and are believed to be linked to changes in the exhaust concentration when the flame ignites and extinguishes. Further investigations into this dynamic exhaust composition are needed. The fuel utilization is investigated and a high utilization of 64% was achieved. Compared with a $H_2/N_2$ baseline at the same total flow and equivalent number of electrons available per unit time, the mT-SOFC with microcombustion exhaust achieved 68% of the power density achieved with $H_2/N_2$. A long-term test of 60 minutes resulted in stable performance and no significant decrease in power density.

What is claimed is:
1. A system, comprising:
   a single microflow reactor formed into a first tube having a first internal diameter, a first end for receiving a fuel to be combusted and a second end for expelling a combustion exhaust, wherein the first internal diameter is less than four millimeters and the microflow reactor has a maximum wall temperature of up to 1000° C.;
   a single microtubular solid oxide fuel cell having an anode formed into a second tube of a second internal diameter and having an inlet and an outlet, an electrolyte surrounding the anode, and a cathode surrounding the electrolyte, wherein the inlet of the second tube is sealed directly to the second end of the first tube with the first internal diameter and the second internal diameter coupled directly together and in fluid communication so that the anode of the second tube will receive the combustion exhaust; and
   a fuel source configured to deliver a combustible hydrocarbon to the intake of the microflow reactor at a flow rate of up to 6 mL per minute at an equivalence ratio of up to 5.5 without any production of soot.
2. The system of claim 1, wherein the anode comprises nickel and yttria stabilized zirconia having the formula $(Y_2O_3)_{0.08}(ZrO_2)_{0.92}$ (YSZ).
3. The system of claim 2, wherein the electrolyte comprises YSZ.

4. The system of claim 3, wherein the cathode comprises lanthanum strontium cobalt ferrite having the formula $(La_{0.60}Sr_{0.40})_{0.95}Co_{0.20}Fe_{0.80}O_{3-x}$ (LSCF) and samaria-doped ceria in a weight ratio of 7:3.

5. The system of claim 1, wherein the microflow reactor comprises a quartz tube.

6. The system of claim 1, wherein the fuel source comprises propane.

7. The system of claim 1, wherein the anode comprises nickel oxide and yttria-stabilized zirconia.

8. The system of claim 7, wherein the electrolyte comprises yttria stabilized zirconia (YSZ).

9. The system of claim 8, wherein the cathode comprises samaria-doped ceria.

10. The system of claim 9, further comprising a fuel source configured to deliver a combustible hydrocarbon to the first end of the microflow reactor at a flow rate of up to 6 mL per minute at an equivalence ratio of up to 5.5.

11. The system of claim 1, wherein the fuel source comprises ethane.

12. The system of claim 1, wherein the second internal diameter is less than three millimeters.

13. The system of claim 12, wherein the first internal diameter is 3.6 millimeters and the second internal diameter is 2.2 millimeters.

14. The system of claim 1, wherein the second internal diameter is within two millimeters of the first internal diameter.

\* \* \* \* \*